(12) United States Patent
Naous

(10) Patent No.: US 10,402,052 B2
(45) Date of Patent: Sep. 3, 2019

(54) GUIDED EXPLORATION OF ROOT CAUSE ANALYSIS

(71) Applicant: AppDynamics LLC, San Francisco, CA (US)

(72) Inventor: Jad Naous, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 15/224,391

(22) Filed: Jul. 29, 2016

(65) Prior Publication Data

US 2018/0032216 A1 Feb. 1, 2018

(51) Int. Cl.
*G06F 3/0482* (2013.01)
*G06Q 10/06* (2012.01)

(52) U.S. Cl.
CPC ....... *G06F 3/0482* (2013.01); *G06Q 10/0639* (2013.01)

(58) Field of Classification Search
CPC ......... G06Q 10/00; G06Q 40/06; G06F 17/60
USPC ....................................................... 705/7.39
See application file for complete search history.

(56) References Cited

U.S. PATENT DOCUMENTS

| 8,200,527 | B1* | 6/2012 | Thompson | ......... | G06Q 10/0639 |
| | | | | | 705/7.39 |
| 8,738,425 | B1* | 5/2014 | Basu | ................ | G06Q 10/06393 |
| | | | | | 705/7.38 |
| 8,996,397 | B2* | 3/2015 | Grace | ............ | G06Q 10/063114 |
| | | | | | 705/7.39 |
| 9,646,276 | B2* | 5/2017 | Rea | ..................... | G06Q 10/0639 |
| 2011/0196719 | A1* | 8/2011 | Bhandari | ............... | G06Q 10/00 |
| | | | | | 705/7.39 |
| 2013/0332241 | A1* | 12/2013 | Taylor | ................ | G06Q 10/0637 |
| | | | | | 705/7.36 |
| 2013/0339099 | A1* | 12/2013 | Aidroos | ................. | G06Q 50/01 |
| | | | | | 705/7.36 |

OTHER PUBLICATIONS

Divya et al (Business Analysis for Hanover: Program Analytics Dashboard ), Dec. 2009, The Hanover Insurance Group , pp. 1-143 (Year: 2009).*

* cited by examiner

*Primary Examiner* — Romain Jeanty
(74) *Attorney, Agent, or Firm* — Behmke Innovation Group LLC; James Behmke; Stephen D. LeBarron

(57) ABSTRACT

A guided exploration is provided to enable a user to view relationships among different entities associated with a performance issue for a monitored entity. Entity relationship data is generated to describe how the different entities are related, and a dashboard user interface is provided to enable the user to view the generated entity relationship data. User input indicating a starting point for viewing the entity relationship data is received, and based on the received starting point, the generated entity relationship data is visually displayed to the user. The displayed entity relationship data is changed based on user input to enable the user to perform the guided exploration.

23 Claims, 20 Drawing Sheets

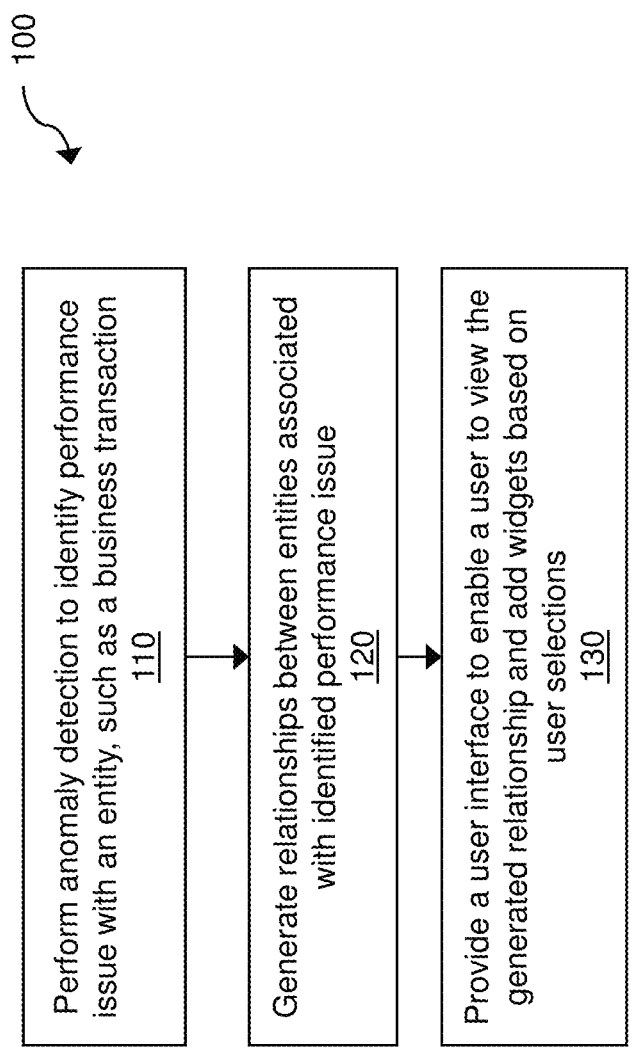

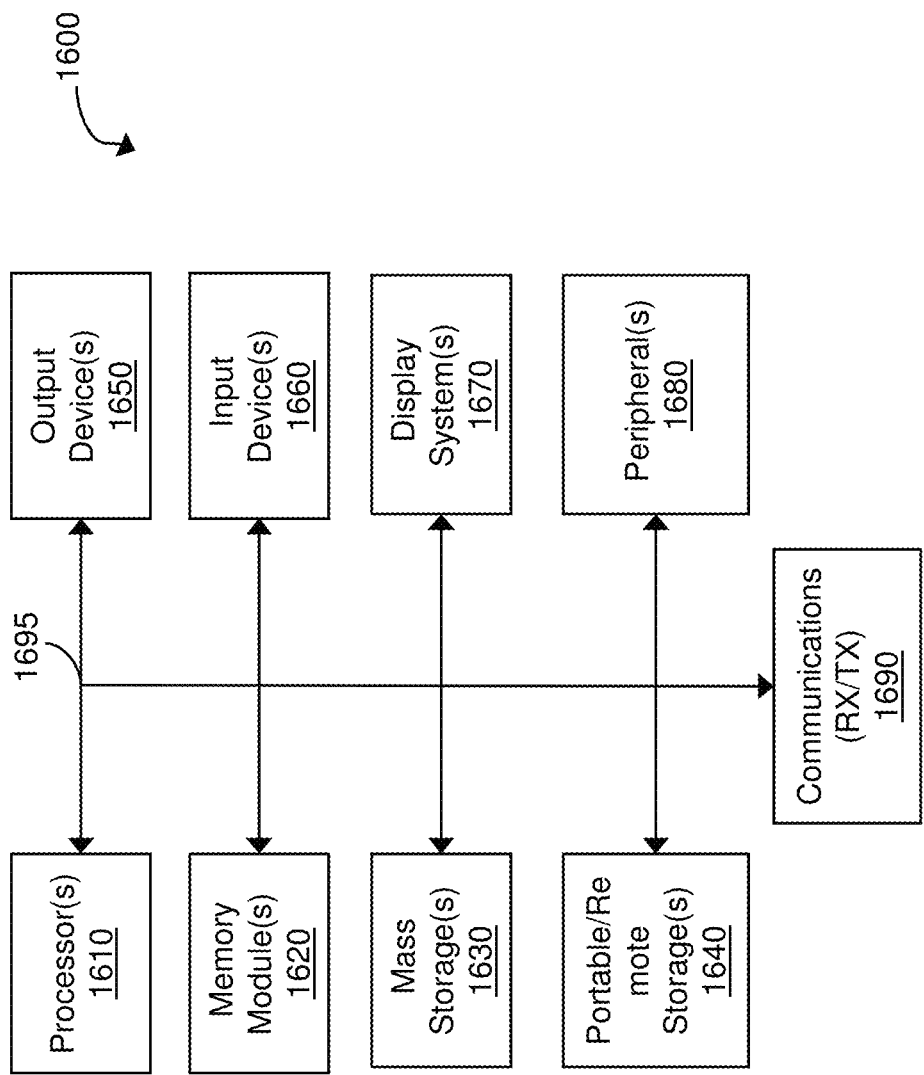

GUIDED EXPLORATION OF ROOT CAUSE ANALYSIS

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of Guided Exploration of a monitored environment is disclosed.

In one aspect, a system for providing a guided exploration of a monitored entity is disclosed. The system includes a processor, a memory; and one or more modules stored in the memory and executable by a processor to perform operations including detect a performance issue associated with the monitored entity running in a monitored environment; generate entity relationship data indicative of a chain of relationships among different entities associated with the detected performance issue; provide a dashboard user interface to enable a user to view the generated entity relationship data; receive user input through the dashboard user interface that indicate a starting point of the guided exploration; display the entity relationship data at the starting point in the chain of relationships among the different entities associated with the detected performance issue; and change the display of the entity relationship data along the chain of relationships among the different entities associated with the detected performance issue based on additional user input received through the dashboard user interface.

The system can be implemented in various ways to include one or more of the following features. For example, the user input indicating the starting point entity associated with the detected performance issue for starting the guided exploration can include a business transaction, a tier, a node, a database, a network, a machine, or a process. The one or more modules can be executable by a processor to display a user selectable list of entities related to the starting point entity indicated by the user input received through the dashboard user interface and to display a list of user selectable datatypes and data available for the user selectable entities related to the starting point entity. The one or more modules can be executable by a processor to receive through the dashboard user interface, user input selecting one of the user selectable entities related to the starting point entity, one of the user selectable datatypes, and one of the user selectable data available for the user selectable entities related to the starting point entity. The one or more modules can be executable by a processor to automatically add a widget to a display portion of the dashboard user interface, the widget displaying the user selected datatype and data available for the selected related entity. The one or more modules can be executable by a processor to change the display of the entity relationship data including: display a new list of user selectable entities related to the previously selected entity and new lists of user selectable datatypes and data available for the new list of user selectable entities related to the most recently user selected related entity; receive user selection of one of the user selectable related entities from the new list, user selection of one of the datatypes and one of the data from the new lists of datatypes and data available for the new list of user selectable entities; and automatically add a new widget to the display portion of the dashboard user interface, the new widget displaying the user selected new datatype and data available for the user selected related entity selected from the new list. The datatype and the new datatype can include metric, events, logs, snapshots, or configurations. The data and new data can include average response time, calls per minute, load, number of slow calls, or number of very slow calls. The new widget can be overlaid on top of the widget or displayed adjacent to the widget. The widget and the new widget can be customizable on the display portion of the dashboard user interface. The one or more modules can be executable by a processor to perform operations including: provide a user selectable filter for at least one of the lists of related entities, datatypes, data, new related entities, new datatypes, and new data; receive user input making a selection on the provided filter; and change the display of the entity relationship data to include a result of the received filter selection. The one or more modules can be executable by a processor to generate a template showing the user selections of the starting point entity, the related entity along the chain of entity relationships, and the filter selection. The one or more modules can be executable by a processor to perform operations including: receive user input changing one of the entities in the generated template; and automatically change the entity relationship data to reflect the change of one of the entities. The one or more modules can be executable by a processor to perform operations including providing a collaboration tool associated with the dashboard user interface to enable multiple users to collaborate on the template.

In another aspect, a method for providing a guided exploration of a monitored entity is disclosed. The method can include detecting a performance issue associated with the monitored entity running in a monitored environment; generating entity relationship data indicative of a chain of relationships among different entities associated with the detected performance issue; providing a dashboard user interface to enable a user to view the generated entity relationship data; receiving user input through the dashboard user interface that indicate a starting point of the guided exploration; displaying the entity relationship data at the starting point in the chain of relationships among the different entities associated with the detected performance issue; and changing the display of the entity relationship data along the chain of relationships among the different entities associated with the detected performance issue based on additional user input received through the dashboard user interface.

The method can be implemented in various ways to include one or more of the following features. For example, the method can include displaying a user selectable list of entities related to the starting point entity indicated by the user input received through the dashboard user interface; and displaying a list of user selectable datatypes and data available for the user selectable entities related to the starting point entity. The method can include receiving user input selecting one of the user selectable entities related to the starting point entity, one of the user selectable datatypes, and one of the user selectable data available for the user selectable entities related to the starting point entity. The method can include automatically adding a widget to a display portion of the dashboard user interface, the widget displaying the user selected datatype and data available for the selected related entity. Changing the display of the entity relationship data can include displaying a new list of user selectable entities related to the previously selected entity and new lists of user selectable datatypes and data available for the new list of user selectable entities related to the most recently user selected related entity; receiving user selection of one of the user selectable related entities from the new list, user selection of one of the datatypes and one of the data from the new lists of datatypes and data available for the new list of user selectable entities; and automatically adding a new widget to the display portion of the dashboard user interface, the new widget displaying the user selected new datatype and data available for the user selected related entity selected from the new list. The method can include providing a user selectable filter for at least one of the lists of related entities, datatypes, data, new related entities, new datatypes, and new data; receiving user input making a selection on the provided filter; and changing the display of the entity relationship data to include a result of the received filter selection. The method can include generating a template showing the user selections of the starting point entity, the related entity along the chain of entity relationships, and the filter selection. The method can include receiving user input changing one of the entities in the generated template; and automatically change the entity relationship data to reflect the change of one of the entities. The method can include providing a collaboration tool associated with the dashboard user interface to enable multiple users to collaborate on the template.

Yet in another aspect, a non-transitory computer readable medium embodying instructions when executed by a processor can cause operations to be performed including: detecting a performance issue associated with a monitored entity running in a monitored environment; generating entity relationship data indicative of a chain of relationships among different entities associated with the detected performance issue; providing a dashboard user interface to enable a user to view the generated entity relationship data; receiving user input through the dashboard user interface that indicate a starting point of the guided exploration; displaying the entity relationship data at the starting point in the chain of relationships among the different entities associated with the detected performance issue; and changing the display of the entity relationship data along the chain of relationships among the different entities associated with the detected performance issue based on additional user input received through the dashboard user interface.

The non-transitory computer readable medium can be implemented in various ways to include one or more of the following features. For example, the non-transitory computer readable medium embodying instructions when executed by a processor can cause operations including displaying a user selectable list of entities related to the starting point entity indicated by the user input received through the dashboard user interface; and displaying a list of user selectable datatypes and data available for the user selectable entities related to the starting point entity.

BRIEF DESCRIPTION OF THE DRAWINGS

FIG. 1A is a process flow diagram of an exemplary process for providing guided exploration as disclosed.

FIG. 16 is a block diagram of an exemplary computing system implementing the disclosed technology.

DETAILED DESCRIPTION

Figure 1B:
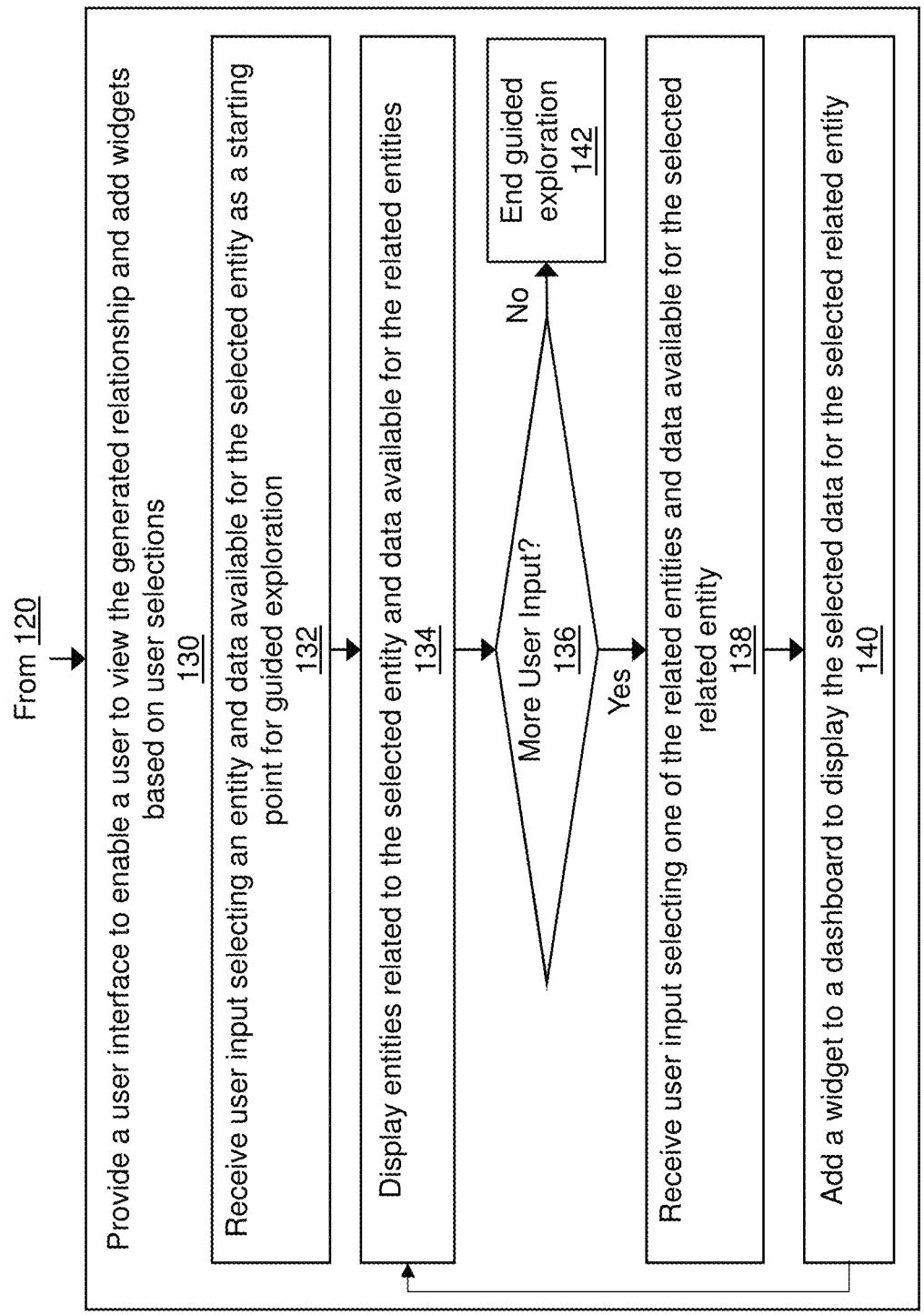
FIG. 1B is a process flow diagram showing an exemplary process for enabling the user to perform the guided exploration.

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and user experience, each web application can be monitored to provide insight into information that can negatively affect the overall performance of the web application. For example, information including bottle necks in communication, communication failures and other information regarding performance of the services that provide the web application can be detected. A given event on a given server or tier of application nodes may often affect a remote application, and identifying the root cause of a performance issue can be daunting due to the myriad of choices and paths to diagnose the performance issue. Manually reviewing and processing the performance data of each and every application on multiple servers to detect the event causing a problem is extremely time consuming exercise that may never lead to an adequate solution to the performance degradation problem. In general, the various paths are left to the user to explore without any guidance and the various data to analyze is left to the user to choose. This leads to long mean time to repair as the user in many instances is left to stumble around looking for the right set of data to review in hopes of identifying the root cause of the performance issue.

Guided Exploration Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to diagnose and identify the root cause of a performance issue in a monitored environment using guided exploration. The guided exploration as disclosed in this patent document can be applied to any entity whether the entity is related to a business transaction or otherwise. Specifically, the disclosed technology provides for a model of the relationships between various entities in the monitored environment. For example, a machine is related to a node running on that machine, and a tier includes multiple nodes. The model that indicates the relationships between various entities can be visualized using appropriate data graphs, charts, tables, and graphical user interfaces to allow the user to visually navigate from reviewing performance data in the context of one entity to reviewing performance data of a related entity. Using the visualization of the model, the user can visually navigate the entire data set related to a particular performance issue and understand how the data set relates to the performance issue in order to identify the root cause of the performance issue.

Guided Exploration Process

FIG. 1A is a process flow diagram of an exemplary process 100 for providing guided exploration as disclosed. Troubleshooting a potential performance issue with a monitored environment begins with anomaly detection to inform the user about the potential performance issue (110). The disclosed technology provides for a guided exploration of the monitored environment to provide the user with a deeper access to the underlying data and ultimately identify and address the root cause of the potential performance issue.

Guided exploration can help a user to identify the root cause of the detected performance issue by generating relationship data indicative of a chain of relationships among different entities associated with the detected anomaly or performance issue (120). A user interface is provided on a dashboard to enable the user to view the generated relationships and add widgets to the dashboard based on user selections (130).

FIG. 1B is a process flow diagram showing an exemplary process for enabling the user to perform the guided exploration. Specifically, FIG. 1B shows an exemplary process (130) for providing the user interface on a dashboard to enable the user to view the generated relationships and add widgets to the dashboard based on user selections. The guided exploration begins from a particular starting point in the chain of relationships in the monitored environment where the performance issue has been identified. User input selecting an entity and data available for the selected entity is received as a starting point for the guided exploration (132). For example, user input selecting a particular entity, such as a business transaction and the average response time for the particular entity, such as a business transaction may be received. Responsive to the received user input, entities related to the selected entity and data available for the related entities are displayed on the dashboard (134). The user can select any of the related entities and receive analysis of the available data for the related entities. When determined that user desired to drill down further into the related entities (136, Yes), user input selecting one of the related entities and the available data for the selected related entity is received (138). Responsive to the user selection of the related entity and the available data for the selected related entity, a widget is automatically added to the dashboard to display the selected data for the selected related entity (140). The process then loops back to displaying the related entities for the previously selected entity (134) and the processes (136), (138), and (140) repeats as long as the user continues to drill down to select a related entity. In this manner, the user can perform a guided exploration up and down the chain of relationships based on the user selection. When the user stops drilling down into the related entities (136, No), the guided exploration ends (142).

The widgets added during the guided exploration can display relevant user selected metrics for the user selected entities. The visualized relationships among different entities associated with the detected anomaly or performance issue can enable the user to easily navigate from viewing metric data of one entity or object to viewing metric data of a related entity object. For example, the user can view an application running on a machine to review metric data on the performance of the application and the performance of the machine running the application. When the application running on multiple machines, the user can select a different machine. Thus, the user can navigate to any of the machines, or any nodes in a tier, and any of the tiers associated with a business transaction.

Each entity associated with a performance issue has a set of data sources related to the entity. For example, a business transaction entity can have a set of data sources associated with the business transaction, including metadata identifying the types of metrics to be monitored, metrics data that includes the actual monitored data for the metrics, logs of the monitored data, snapshots of the monitored data, etc. The disclosed guided exploration enables the user to easily and intuitively navigate the relationships between entities, review and compare different data sources, and receive analysis of different data sources. The disclosed guided exploration provides the user with insights into the root cause of the performance issue from the analysis of the data sources. In addition, the disclosed guided exploration allows the user to filter the related entity and data source selections for anomalies and for correlations with the symptoms of the performance issue.

Exemplary Implementations

In various examples of implementations of the disclosed guided exploration, an anomaly detection can identify a business transaction that is slower than a predetermined threshold. The identified slower than threshold business transaction can be provided to a user through an alert, based on a health rule for example. The user can review the identified business transaction and begin a guided exploration to identify the root cause of the slower than threshold business transaction. The related entities for the slower than threshold business transaction are identified including the relationships between the entities. For example, the related entities for the business transaction can include tiers of nodes of servers and machines that the business transaction is running on; databases that the business transaction is contacting, reading, and writing to; related backends; the servers or machines that are actually running the business transaction; and pages that may be accessing the business transaction.

The user may start the guided exploration by reviewing the tier metrics for the business transaction. Through the information presented during the guided exploration, the user can easily identify the relationships that the tiers actually have with other entities. For example, the tiers may be running other business transactions. The tiers associated with a given business transaction may be related to other entities, such as machines, databases, etc. that may affect the performance of different business transactions.

In another exemplary implementation, unbeknownst to the user, a DNS misconfiguration on a number of machines in a monitored environment may be the root cause of a particular performance issue. The DNS misconfiguration can cause a given server to no longer be able to execute outgoing calls. The inability to execute outgoing calls can lead to errors for a business transaction performed by the server to increase significantly for that server.

The user can use the disclosed guided exploration to start troubleshooting the performance issue by reviewing the overall error metrics of the affected business transaction. The guided exploration can visualize for the user the business transaction error metrics on the individual servers. A model behind the guided exploration can filter the overall error metrics for the business transaction to isolate "interesting data" for the user. Using the visualization, such as drop down menu selections, provided by the guided exploration, the user can select servers that are automatically highlighted as having the interesting data. The user is guided to view the filtered data for one such server, which may indicate that the machine-level network metrics are unusually low, indicating an anomaly. The user can then drill down to the networking-related configuration to determine whether there's something anomalous, and the guided exploration can be used to highlight a DNS configuration that does not match the working servers' DNS configuration to identify the root cause of the performance issue. Thus, the guided exploration graphically visualizes and navigates the relationships between entities to show how performance is impacted from one entity to another.

Dashboard Widgets

Figure 2:
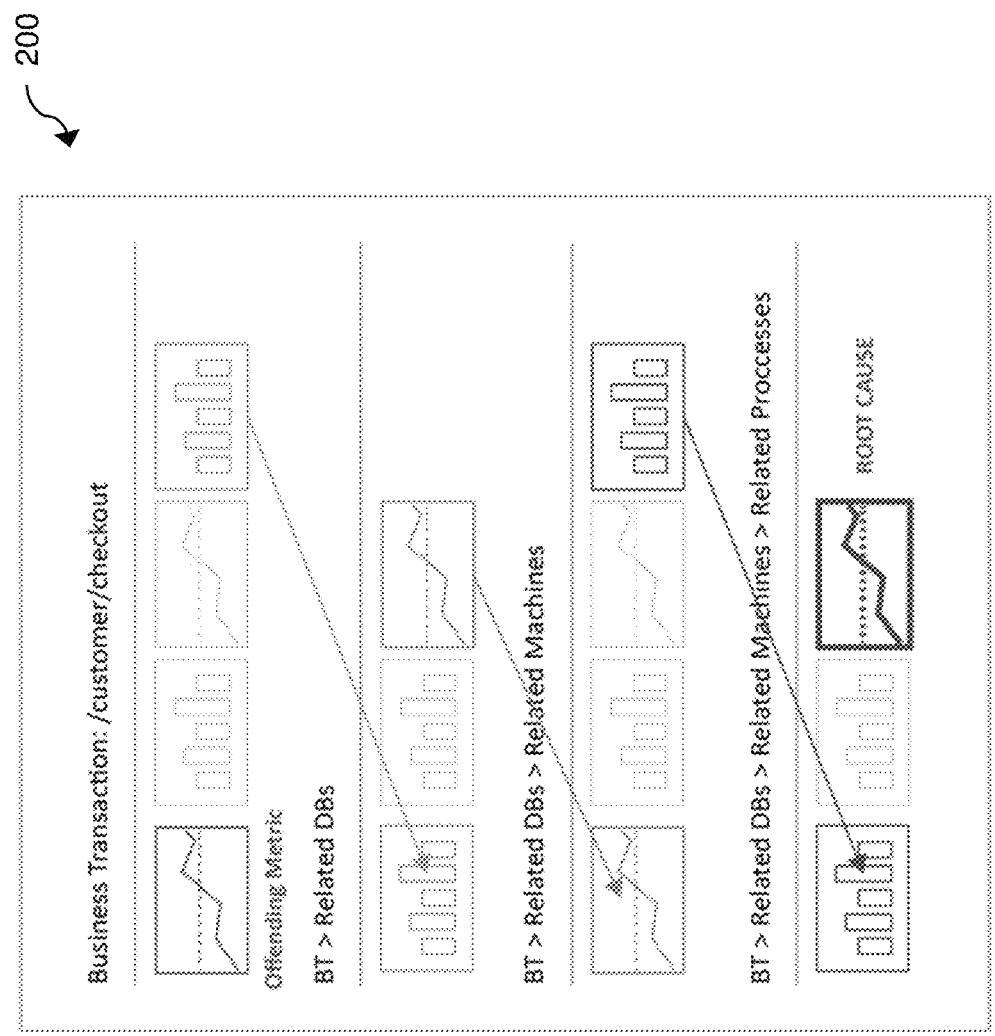
FIG. 2 is a diagram showing an exemplary process of performing guided exploration as disclosed to identify a root cause of a detected performance issue.

FIG. 2 is a diagram 200 showing an exemplary process of performing guided exploration as disclosed to identify a root cause of a detected performance issue. Performing the guided exploration results in building a dashboard of widgets to display the relevant data for related entities that provides clues to the root cause. Starting from an entity, such as a business transaction associated with the performance issue, guided exploration allows the user to drill down to review related entities associated with an identified performance issue and add data widgets of interest to display data, such as metrics data for the user selected entities. Each selection creates new available sections by drilling down into related data of interest. For example, the top row of data widgets (four of them in FIG. 2) represent different exemplary metric data for a particular business transaction (e.g., Business Transaction: /customer/checkout) that are showing anomalies. The user can review the different metrics showing performance issues and selection one of the metric data to review the analysis of that metrics data. This process continues the process until a root cause of the performance issue is found. In the example shown in FIG. 2, the user selected the fourth metric, the Average Response Time (ART) metric that is having a performance issue (i.e., slower than a threshold). Then the user is provided with a list (e.g., using a drop down menu) of related entities, such as the related databases (DBs). Then the user can select one of the related DBs and one of the available data for the selected DB as shown in the second row of FIG. 2. Then the user is provided with a list of entities related to the selected DB and the associated available data for the selected DB. For example, a list of related machines can be provided as shown in row 3 of FIG. 2. The user can select one of the related machines and data available for the selected machine. Then the user can select one of the related processes for the selected machine as shown in row 4 of FIG. 2 to identify that the root cause is the third process as shown in row 3 of FIG. 2.

FIG. 3 is a diagram 300 showing an exemplary user interface for displaying a list of related entities, the associated datatype, and data for user selection. In the example shown in FIG. 3, the right panel 310 shows an exemplary user interface for adding a widget for a related entity, and the left panel 320 shows a graph of the data selected in the right panel 310. For the business transaction customer checkout, the right panel shows a list of entities related to the business transaction customer checkout. For example, the right panel 310 shows related entities 312 including business transaction, related tiers, related nodes, related databases, and related networks. For each related entity, different datatypes 314 available are shown, such as metric, events, logs, snapshots, and configuration. For each of these datatypes 314, the associated data 316 are shown, such as average response time, calls per minute, load, # slow calls, and # very slow calls. The user can add a widget for the selection of entity 312, datatype 314, and data 316 by pressing the add button 318, for example. In the example shown in FIG. 3, business transaction, metric, and average response time are selected by the user and a graphical representation of the average response time for the selected business transaction is shown in the left panel 320.

Figure 3A:
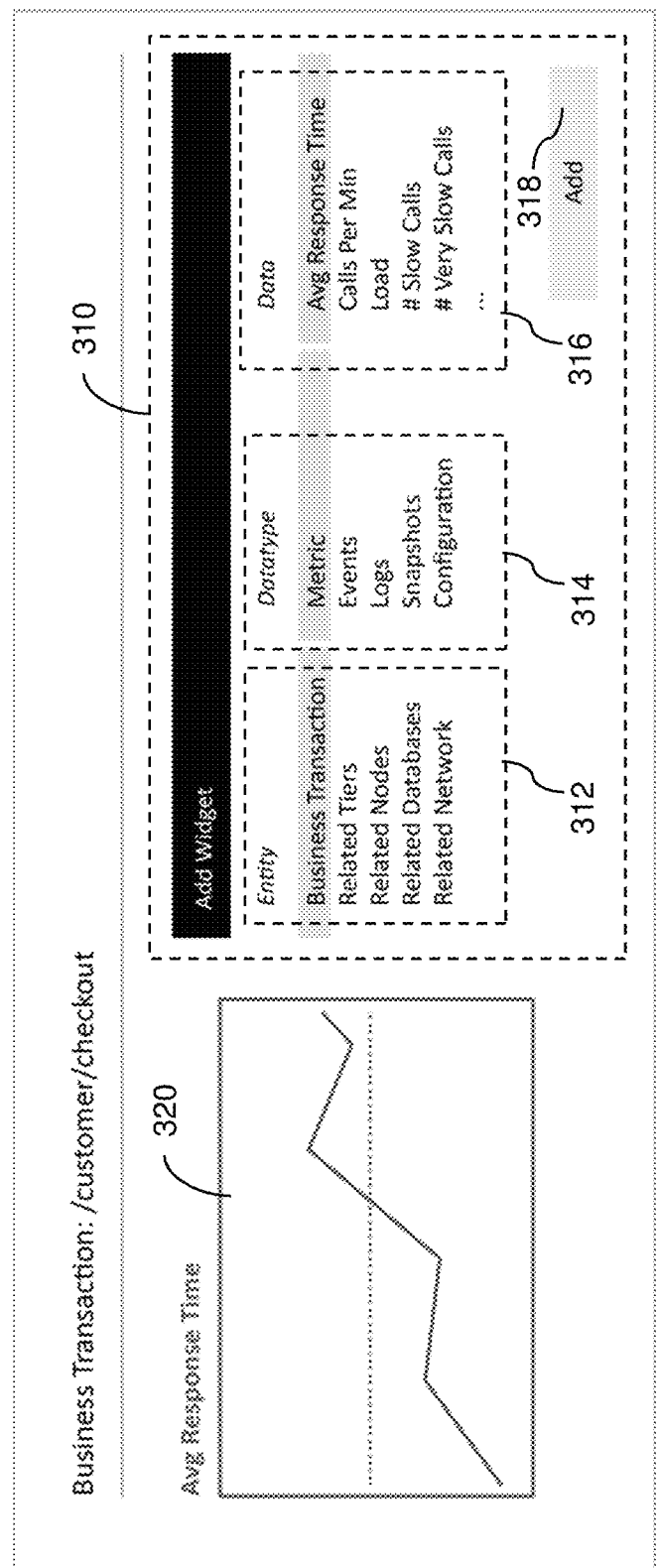
FIGS. 3A-3D are diagrams showing an exemplary user interface for displaying a list of related entities, the associated datatype, and data for user selection.
Figure 3B:
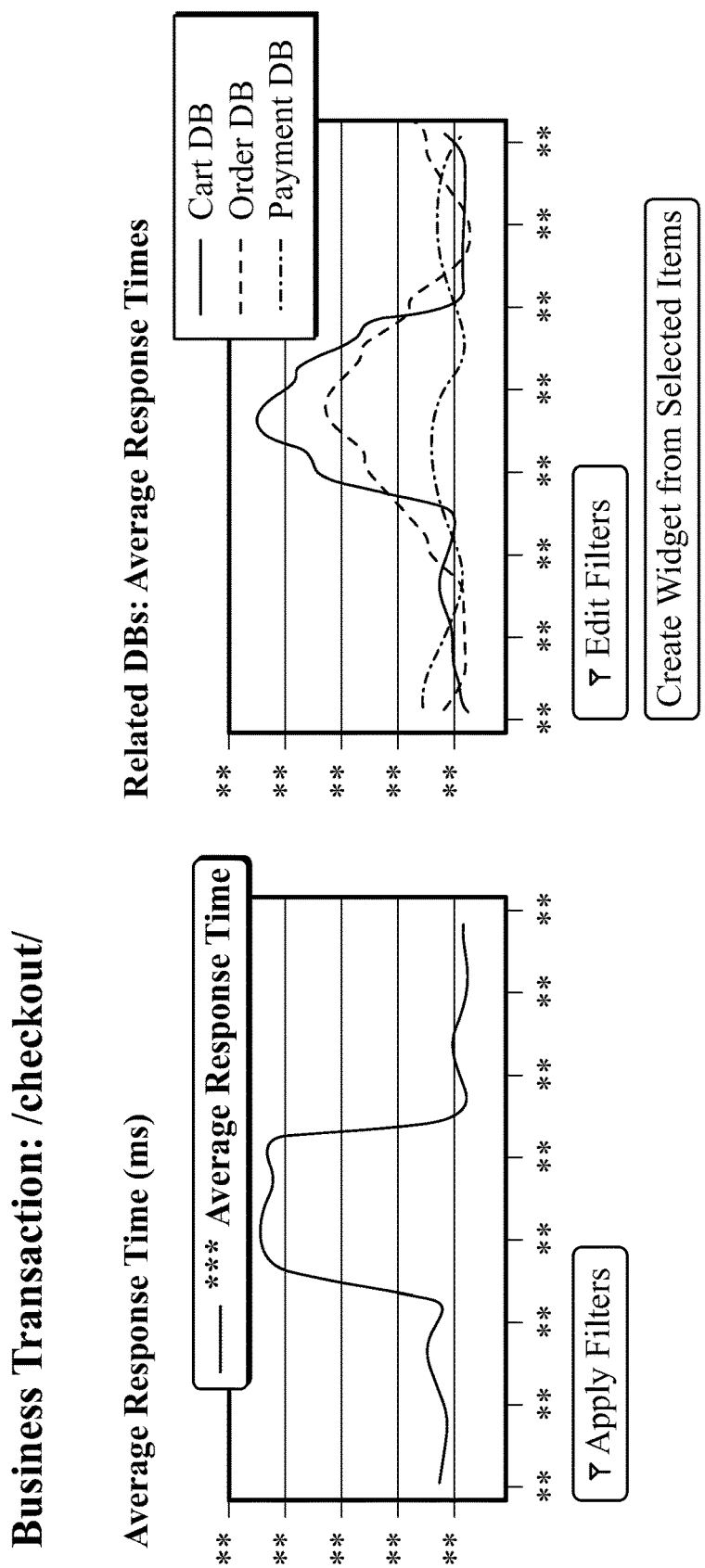
Figure 3C:
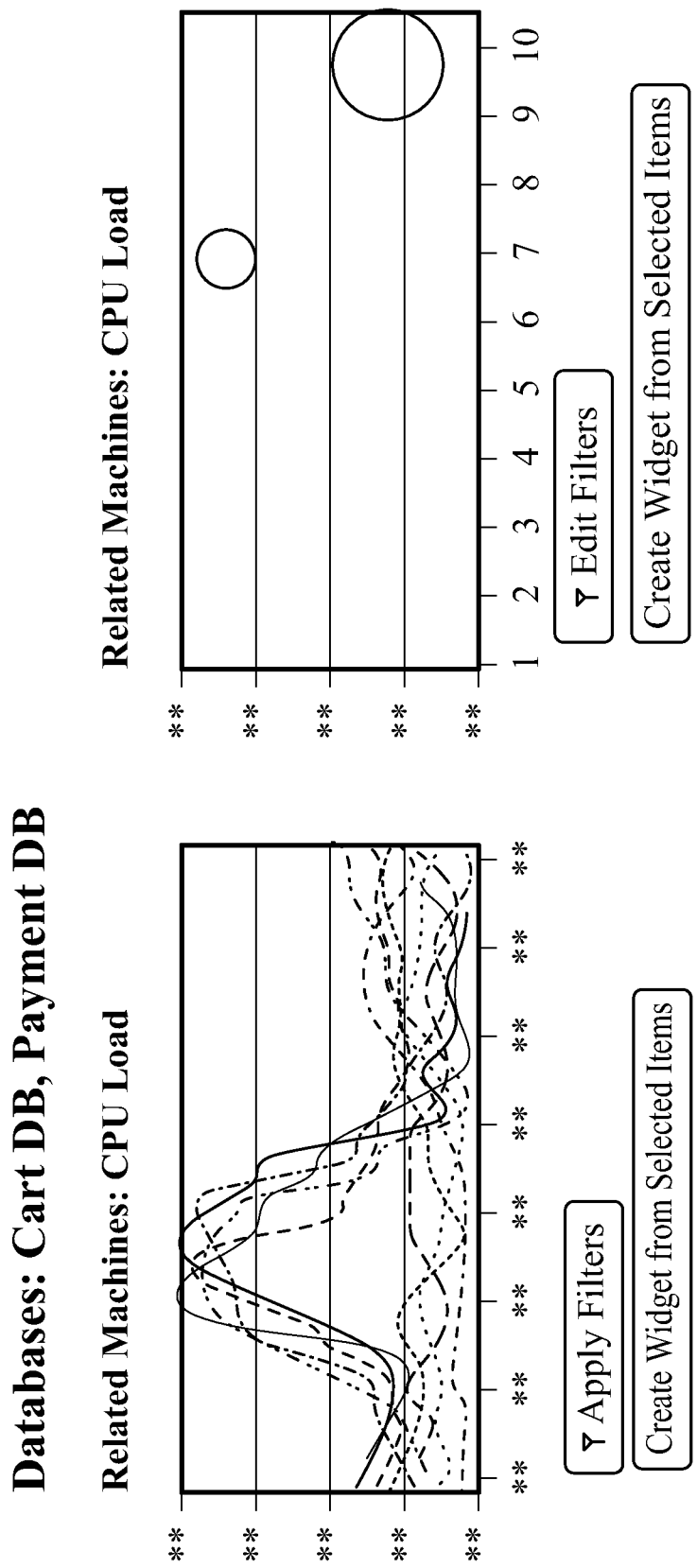
Figure 3D:
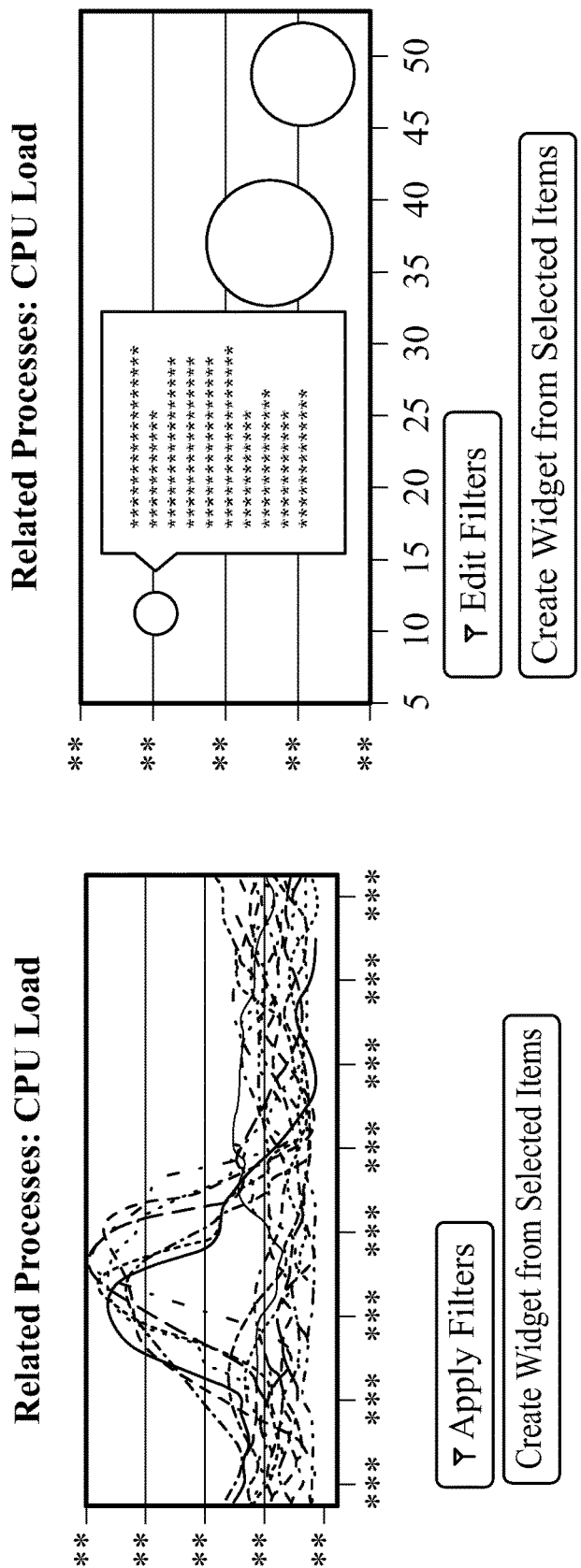

Thus, the user can filter (by making a selection) for the business transaction having performance issues and drill down into the selected business transaction. That selection of the business transaction entity adds a new section in the dashboard as a widget. Using the guided exploration, the user can drill down from the business transaction to the related DBs, then to the related machines, and then to the related processes until the root cause is identified. The drilling down process using the guided exploration adds metrics and widgets related to those entities, such as related DBs, machines, processes, etc. For example, widgets and metrics for the business transaction having performance issues can be added and then the user can drill down to the DBs that may affect the business transaction, then to the machines that may affect the DBs (e.g., issues with CPUs), and then the processes that may affect the machines. For example, after drilling down into the processes, the user may notice that there are some processes that show up around midnight when the performance issue with the business transaction occurs. Then the user can review the metrics for those processes to determine whether the processes are the root cause of the performance issues detected for the business transaction. FIGS. 3B-3D shows this process.

Each time the user drills down into a related entity, the user is setting a new context to display on the dashboard. In this manner, each time the user drills down into a related entity, the user is switching context from one entity to a related entity. In other words, the drill down is to the entities that are represented on the filtered and customized graph in a particular context. Thus, these are related entities and also a subset of all the related entities. The entities of interest to the user (for example, drill down to the machines with the highest CPU load) are presented in the drill down.

Figure 4:
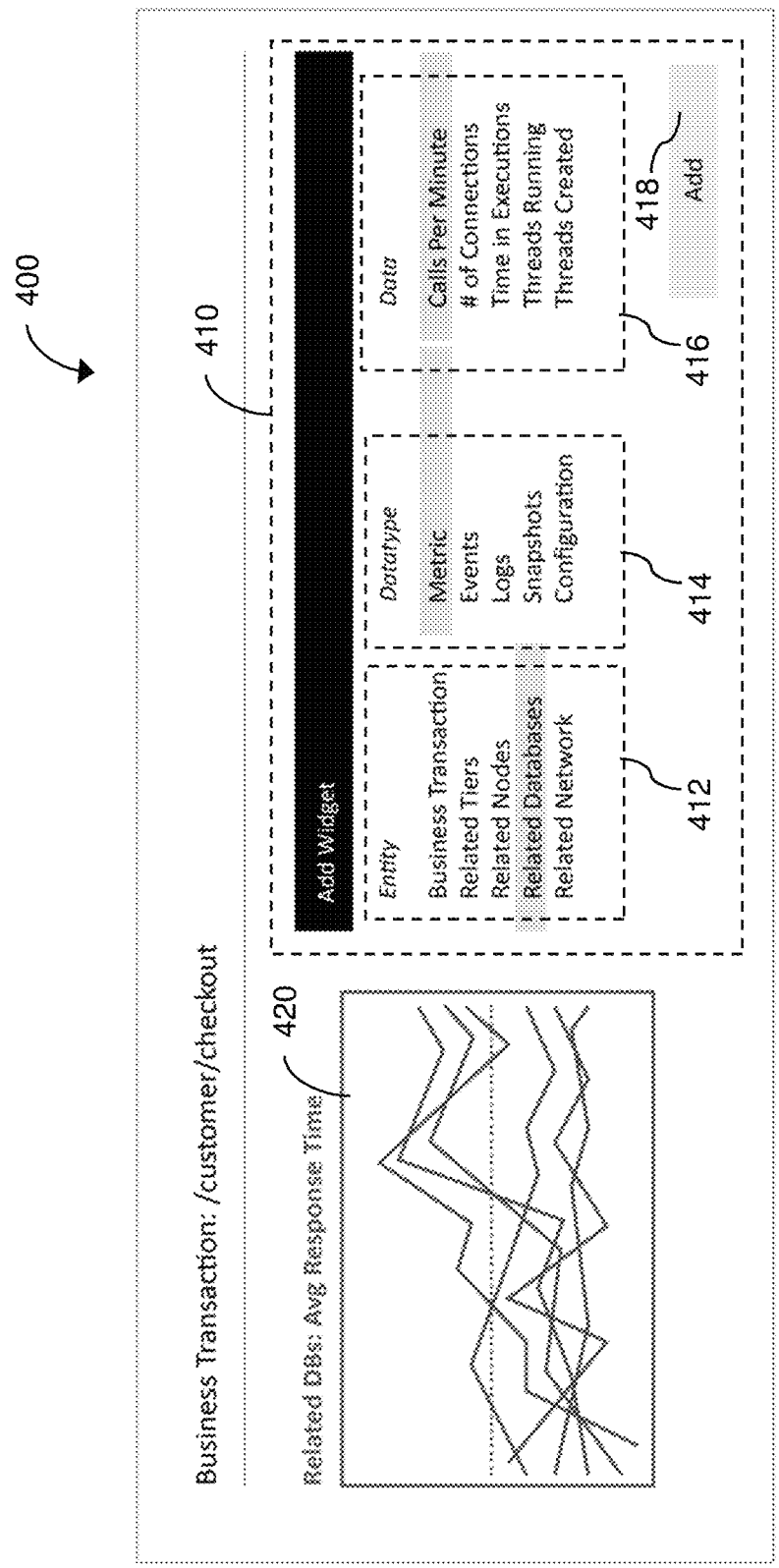
FIG. 4 is a diagram showing another exemplary user interface for displaying a list of related entities, the associated datatype, and data for user selection.

FIG. 4 is a diagram 400 showing another exemplary user interface for displaying a list of related entities, the associated datatype, and data for user selection. In the example shown in FIG. 4, the right panel 410 shows an exemplary user interface for adding a widget for a related entity, and the left panel 420 shows a graph of the data selected in the right panel 410. For the business transaction customer checkout, the right panel shows a list of entities related to the business transaction customer checkout. For example, the right panel 410 shows related entities 412 including business transaction, related tiers, related nodes, related databases, and related networks. For each related entity, different datatypes 414 available are shown, such as metric, events, logs, snapshots, and configuration. For each of these datatypes 414, the associated data 416 are shown, such as average response time, calls per minute, load, # slow calls, and # very slow calls. The user can add a widget for the selection of entity 412, datatype 414, and data 416 by pressing the add button 418, for example. In the example shown in FIG. 4, related databases, metric, and calls per minute are selected by the user as the related entity 412, datatype 414, and data 416. A graphical representation of the call per minute for the selected related databases for the business transaction customer checkout is shown in the left panel 420.

The data for the related databases are added using widgets as shown in the left panel 420. The user can select any of these and add a new widget by pressing the Add button 418, for example. Adding a widget for a selected entity, datatype, and data drops that widget into the dashboard. For example, selecting related databases drops the metrics for all related databases into the dashboard as shown in FIG. 4.

Figure 5:
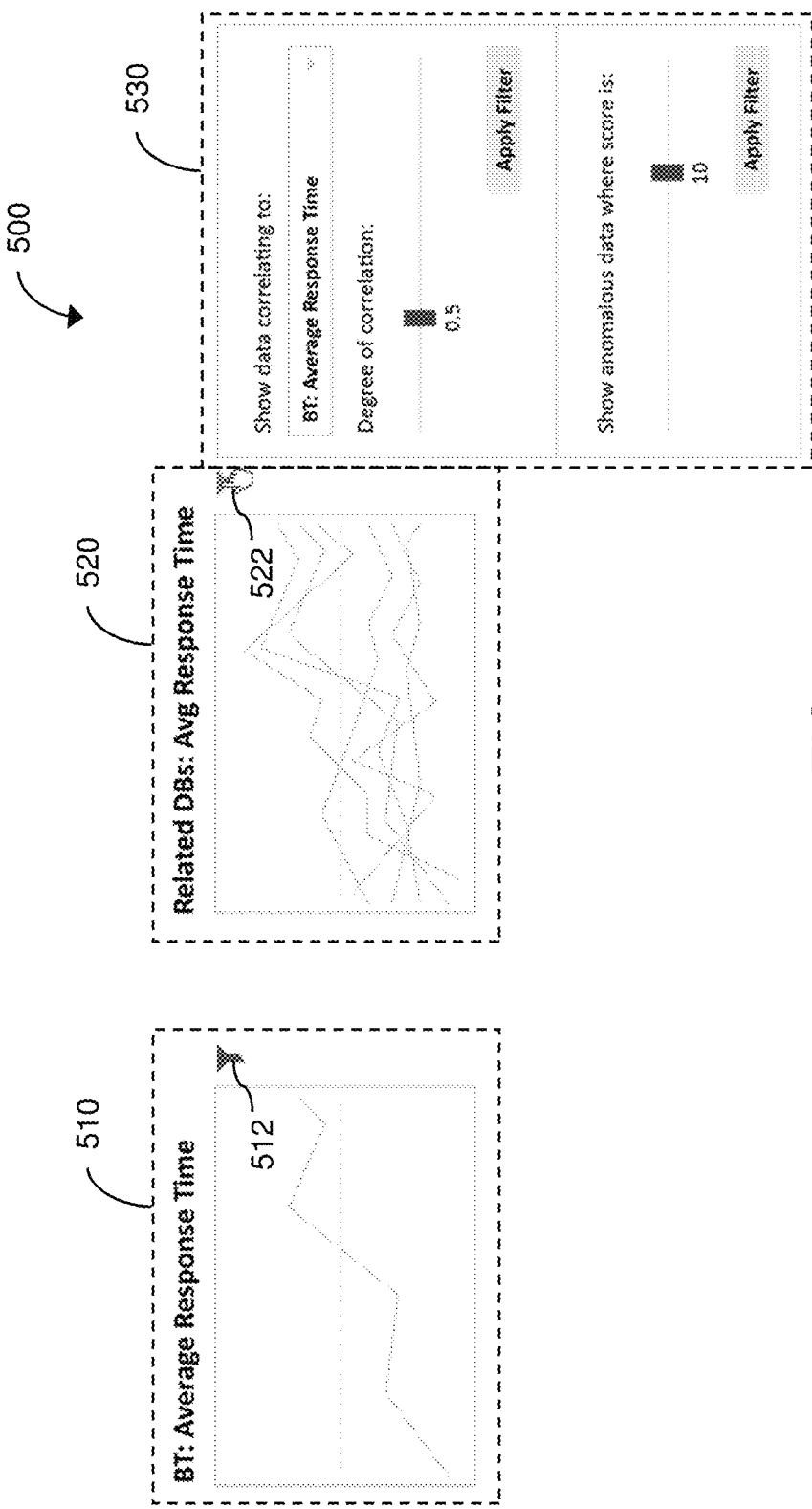
FIG. 5 is a diagram of an exemplary user interface for filtering widgets.

FIG. 5 is a diagram 500 of an exemplary user interface for filtering widgets. As shown in FIG. 5, the added widgets can be filtered to display a subset of the available data in order for the user to drill down to the entities with the interesting subset of data. In the example shown in FIG. 5, two widgets, including business transaction: response time 510 and related DBs: average response time 520 are shown. Each of the widgets can be filtered using a filter interface, such as 512 and 522 shown in FIG. 5. In the example shown in FIG. 5 user selection of the filter interface 522 opens a user selectable interface 530 with different filtering options. For example, the database data can be filtered to obtain the data correlating to specific entities, such as the added related databases metrics data that correlate with the business transaction: average response time, for example. In addition to the user interface that filters the data for those correlating to an entity, the data can be filtered to specify the degree of correlation, and to show anomalous data for a user specified score.

Figure 6:
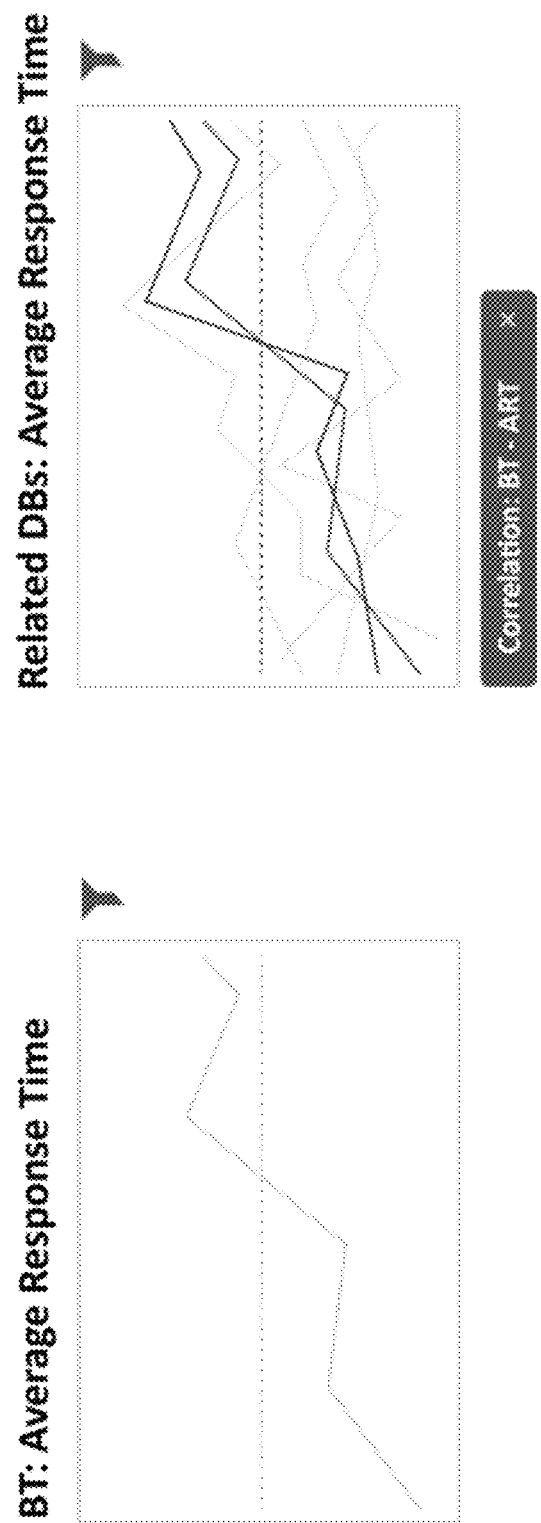
FIG. 6 is a diagram that shows an exemplary result of filtering performing using the user interface of FIG. 5.

FIG. 6 is a diagram 600 that shows an exemplary result of filtering performing using the user interface of FIG. 5. The widgets displaying the data for the related DBs are filtered to show results that correlate to the chosen metric. In the example shown in FIG. 6, only those DBs that correlate to the business transaction: ART are shown in FIG. 6. In this manner, the user can select the next context in the drill down.

Figure 7:
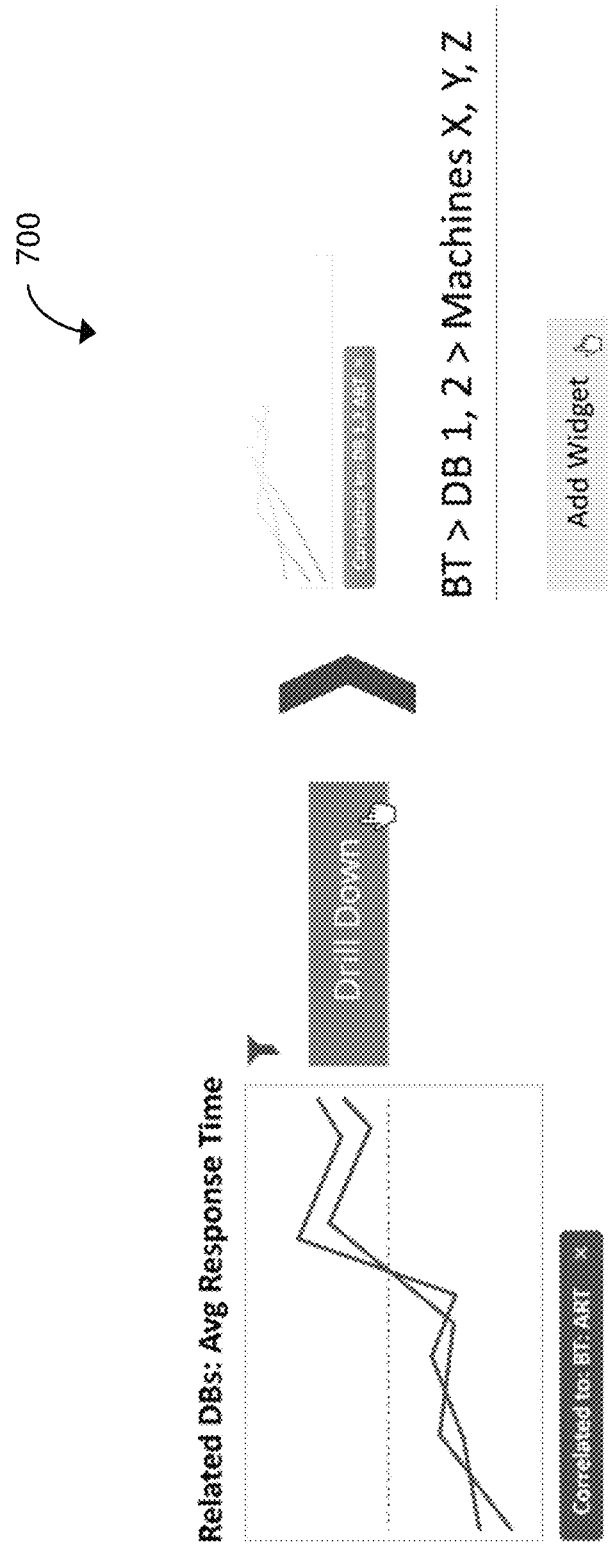
FIG. 7 is a diagram that shows an exemplary context switching for the filtered DBs from FIG. 6.

FIG. 7 is a diagram 700 that shows an exemplary context switching for the filtered DBs from FIG. 6. When the user drills down to the next context for the entities related to the filtered DBs, the set of entities that are related are the entities that are related to the set of DBs that the user selected. In other words, the available related entities are filtered to show only those entities that are related to the DBs that the user specified in the previous context. In the example shown in FIG. 7, the drilling down from the filtered DBs 1 and 2 shows machines X, Y, and Z that are related to the DBs 1 and 2.

Figure 8:
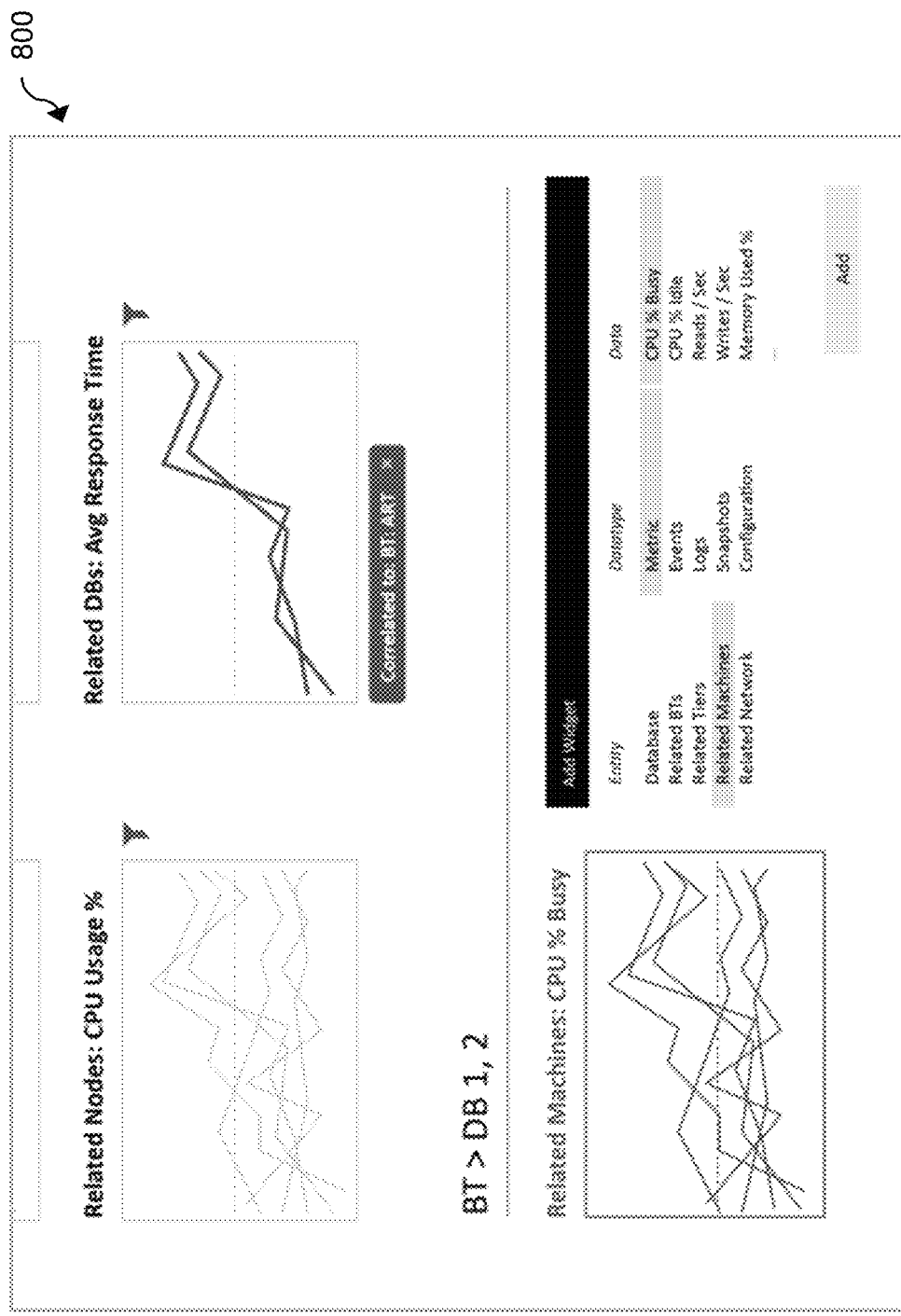
FIG. 8 is a diagram showing an exemplary dashboard of customizable widgets.

FIG. 8 is a diagram 800 showing an exemplary dashboard of customizable widgets. In another aspect, the widgets created on the dashboards can be customized. For example, in addition to adding the widgets as the user changes the context during the drilldown, the display location of the added widgets can be moved around the dashboard. In addition, each section and widgets can be renamed.

Figure 9:
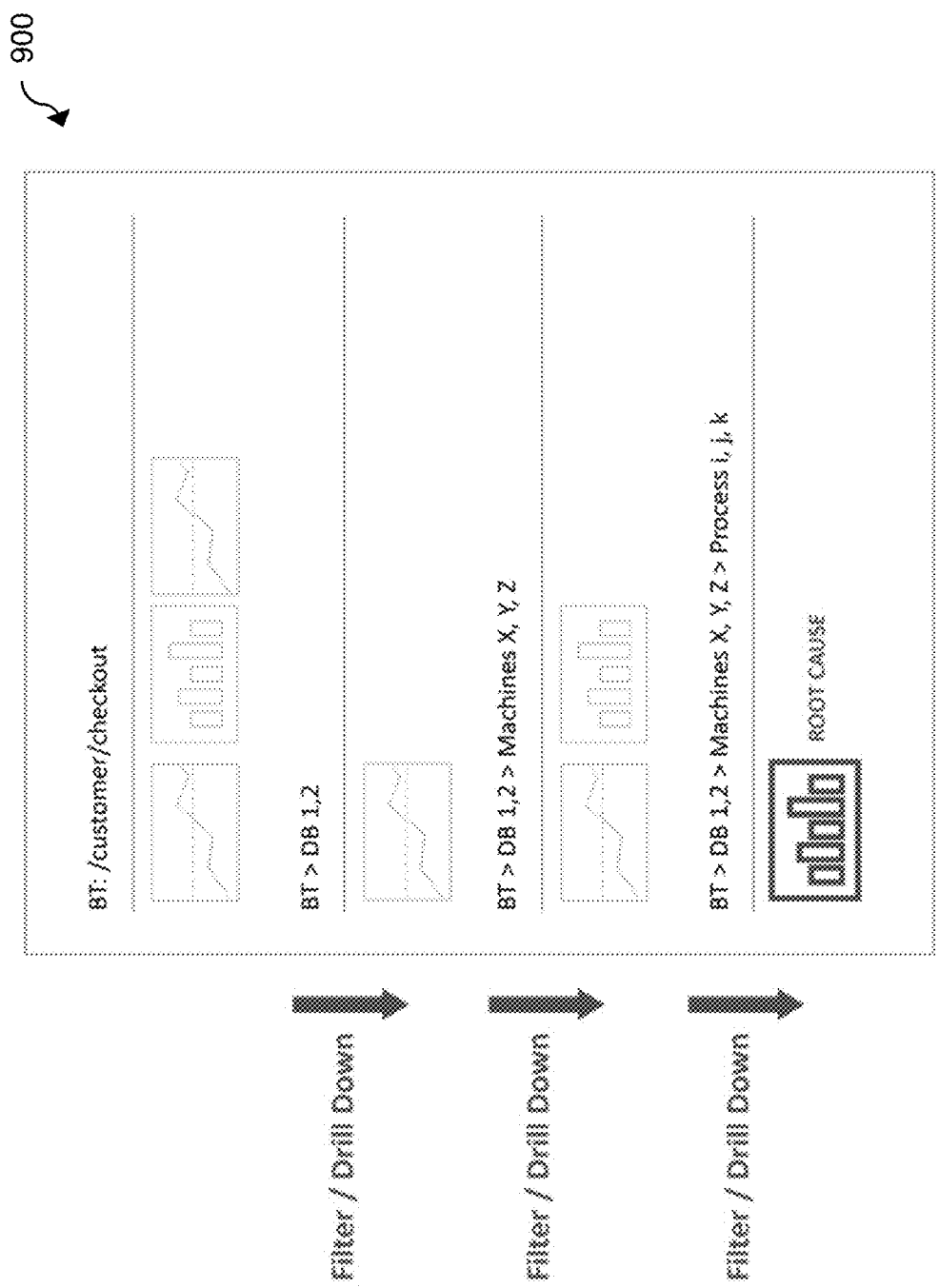
FIG. 9 is a diagram showing an exemplary process for filtering and drilling down the entity relationship model from the starting entity until the root cause is identified.

FIG. 9 is a diagram 900 showing an exemplary process for filtering and drilling down the entity relationship model from the starting entity until the root cause is identified. In the example shown in FIG. 9, the top row represents the starting entity for the guided exploration, business transaction: customer checkout. Then, as shown in the second row, the related DBs are filtered and drilled down to identify those DBs 1 and 2 that are correlated to the specific business transaction. The process of filtering and drilling down is repeated until the root cause is found. For example, in the third row of FIG. 9, the machine entities are filtered to identify only those machines X, Y, and Z that are correlated to the filtered DBs 1 and 2. Then, as shown in fourth row, the related processes are filtered to identify only those processes, i, j, and k that are correlated to filtered machines X, Y, and Z to identify the root cause.

Figure 10:
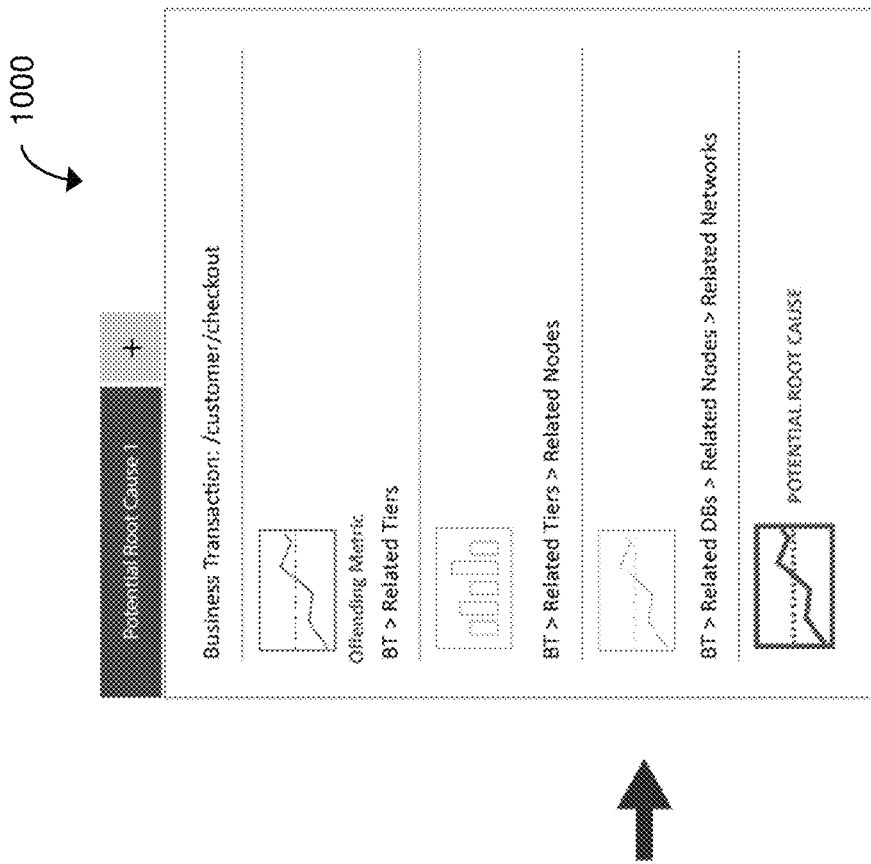
FIG. 10 is a diagram showing an exemplary chain of drill down events during the guided exploration that led to identification of a potential root cause.

FIG. 10 is a diagram 1000 showing an exemplary chain of drill down events during the guided exploration that led to identification of a potential root cause. Because the disclosed guided exploration leaves a visual trail of each context switching performed by the user, guided exploration immediately shows the user how the user actually arrived at the potential root cause of the performance issue. In the example shown in FIG. 10, a visual trail of how each entity is related to the next entity is shown separated by the rows. Thus, the user can follow down or back up the rows of the displayed entity relationships to understand how the entities are related to each other and understand the filtering and selection made at each step by the user. In this manner, each section of the dashboard can represent a node in the graph of entity relationships.

Because the guided exploration creates the visual trail of how one entity in the chain of entities is related to another entity, once the user completes the guided exploration, a template of how the root cause was identified is created. Thus created template can be used by the user to perform another guided exploration simply by swapping out one of the entities in the chain. Any entity can be swapped out to perform the same root cause identification analysis on a different business transaction, DB, machine, process, etc. Swapping out one of the entities in the chain with a new entity changes all other entitles in the chain automatically to those entities that are related to the new entity. For example, changing the business transaction to a new business transaction in FIG. 10 will change the related tiers to those related to the new business transaction and filtered using the same filtering (e.g., correlation to the new entity, correlation level, etc.) used in the template. Then the related notes will change to those nodes that are related to the new related tiers and using the same filtering as the template. Then the related DBs will change to new DBs that are related to the new related tiers and using the same filtering as the template. Then the related machines will change automatically to those machines that are related to the new related DBs and using the same filtering as the template. Then the related processes will change to new processes that are related to the new machines and using the same filtering as the template. In another example, changing out the related tiers to new tiers will change the entity up the chain, the business transaction to a new business transaction and using the same filtering as the template. Then the other entities down the chain will automatically change as described in the previous example.

Figure 11:
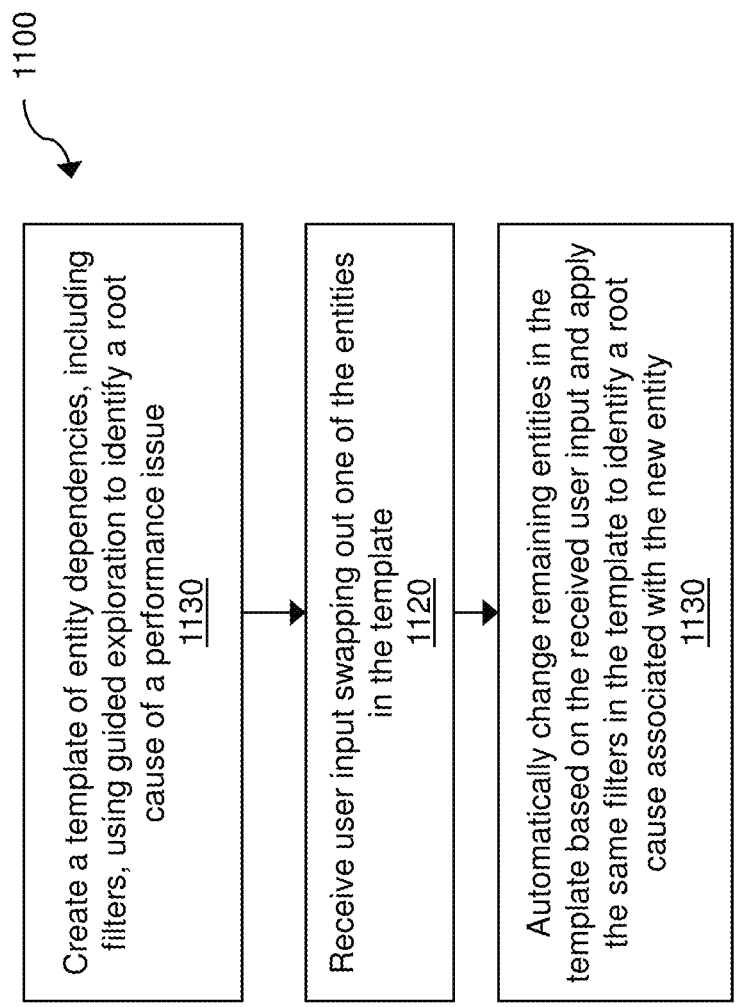
FIG. 11 is a process flow diagram showing an exemplary process for using a template to perform a new root cause analysis.

FIG. 11 is a process flow diagram 1100 showing an exemplary process for using a template to perform a new root cause analysis. As described above, the user can perform guided exploration to identify a root cause of a performance issue and create a resultant template of the guided exploration (1110). The template includes a filter for each entity in a chain of entities that shows how the user arrived at the potential root cause of the performance issue. A user input is received that indicates a request to swap out one of the entities in the chain of entities included in the template (1120). Responsive to the user input requesting one of the entities to be swapped out with a new entity, remaining entities in the chain of entities are automatically changed based on the new entity (1130). As described above, the remaining entities that are automatically changed are changed to new entities that are related to the new entity that user swapped in.

In some implementations, as shown in FIG. 10, the same template created using the guided exploration can be used to show the impact of the root cause and the detected performance issue. For example, the impact of the root cause of the performance issue can be that the European order volume for the customer is down 80%. In addition, the user can drill up the chain of entities instead of drilling down. For example, from the detected business transaction issues, the user can drill up the chain and relate the performance issue to user experience. In another example, the user can relate the business transaction having the performance issue to the number of calls per minute that are being made on a checkout. The ability to drill up can show that the number of orders being completed has dropped.

Figure 12:
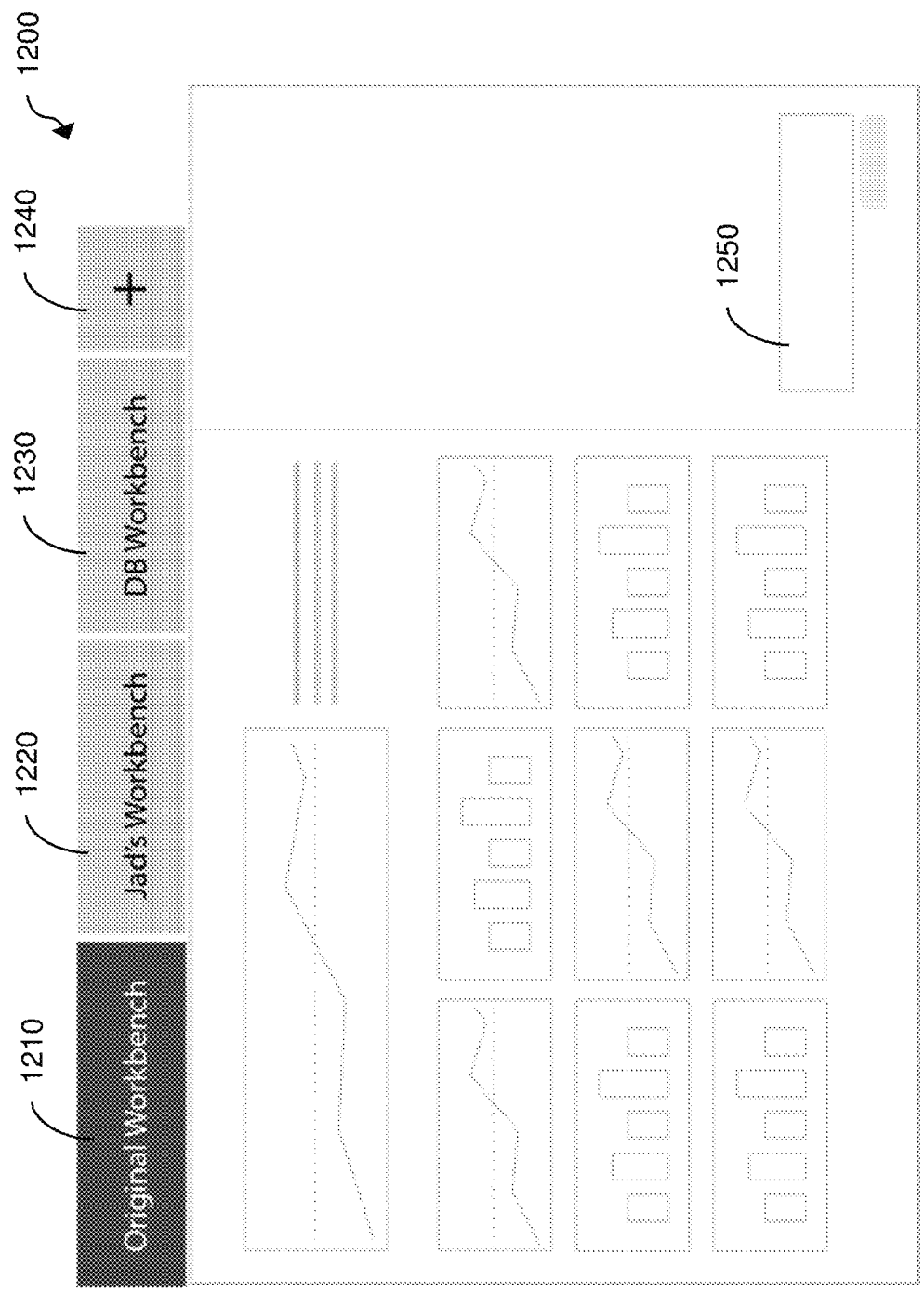
FIG. 12 is a diagram showing an exemplary collaboration tool.

FIG. 12 is a diagram 1200 showing an exemplary collaboration tool. Different users can create different templates by performing different guided explorations and share the resultant template or any other aspects of their guided exploration with each other. In the example shown in FIG. 12, three exemplary workbenches 1210, 1220, 1230 are shown with a user interface 1240 to allow additional workbenches to be added. Each workbench can be selected for viewing as a separate tab on a dashboard. Different team members can create different workbenches and share their workbenches to collaborate on identifying the root cause. In addition, a chat function 1250 can be included for sharing ideas and strategies with team members, for example about the different templates created by different team members. Each user can share his/her own dashboard workbench in real time as the user is performing his/her own guided exploration. In addition to sharing the templates, the users can share widgets created during the guided exploration.

Figure 13:
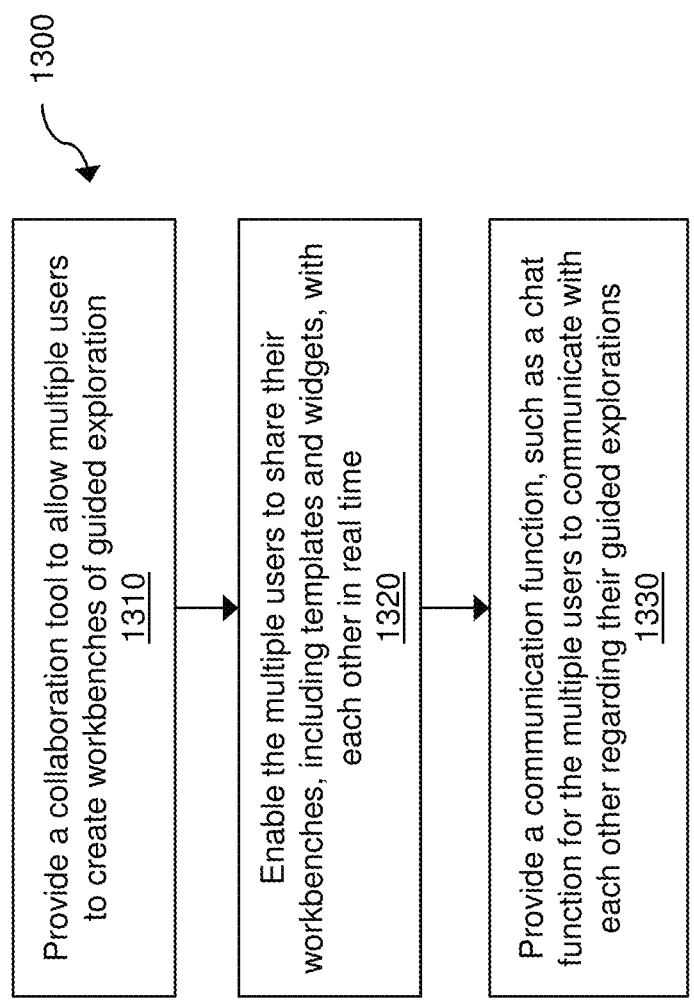
FIG. 13 is a process flow diagram showing an exemplary process for providing a collaboration tool as described with respect to FIG. 12.

FIG. 13 is a process flow diagram 1300 showing an exemplary process for providing a collaboration tool as described with respect to FIG. 12. As described above in FIG. 12, different users can collaborate together to identify the root cause of a common performance issue, such as a slow ART for a given business transaction. A collaboration tool, for example as shown in FIG. 12, can be provided on a dashboard to allow multiple users to create their own workbenches of guided exploration (1310). The collaboration tool can be used to enable the multiple users to share their workbenches, including the templates and widgets, with each other in real time (1320). Such sharing can include sharing each widget during each step of the guided exploration in real time during the guided exploration. In addition, the collaboration tool can be used to provide a communication function, such as a chat function for the multiple users to communicate with each other regarding their guided explorations (1330).

Widget Selections

Different widgets can be available for user selection. The different ones of the available widgets can be selectable based on the entity that the user is interested in reviewing. For example, a given business transaction can have available for selection, widgets for different tiers, machines, databases, backends, and pages associated with the given business transaction. The tiers can have available for selection, widgets for different nodes, machines, backends, databases, downstream tiers, upstream tiers, business transaction, and exit calls associated with the tiers. The nodes can have available for selection, widgets for different tiers, machines, backends, databases, downstream tiers, upstream tiers, business transactions, and exit calls associated with the nodes. The machines can have available for selection, widgets for nodes, processes, and databases associated with the machines. The pages can have available for selection, sessions, business transactions, browsers, and devices associated with the pages. There may be additional widgets available for selection based on a number of factors including the relationships of entities both upstream and downstream of a particular entity.

Widget Filters

Some widget items can be further filtered by a given business transaction. For example, widgets for exit calls, downstream tiers, upstream tiers, databases, and backends can be further filtered by the given business transaction. The filters can be based on the widget item's property values, such as the name, IP address, type, etc.

Application Intelligence Platform Architecture

Figure 14:
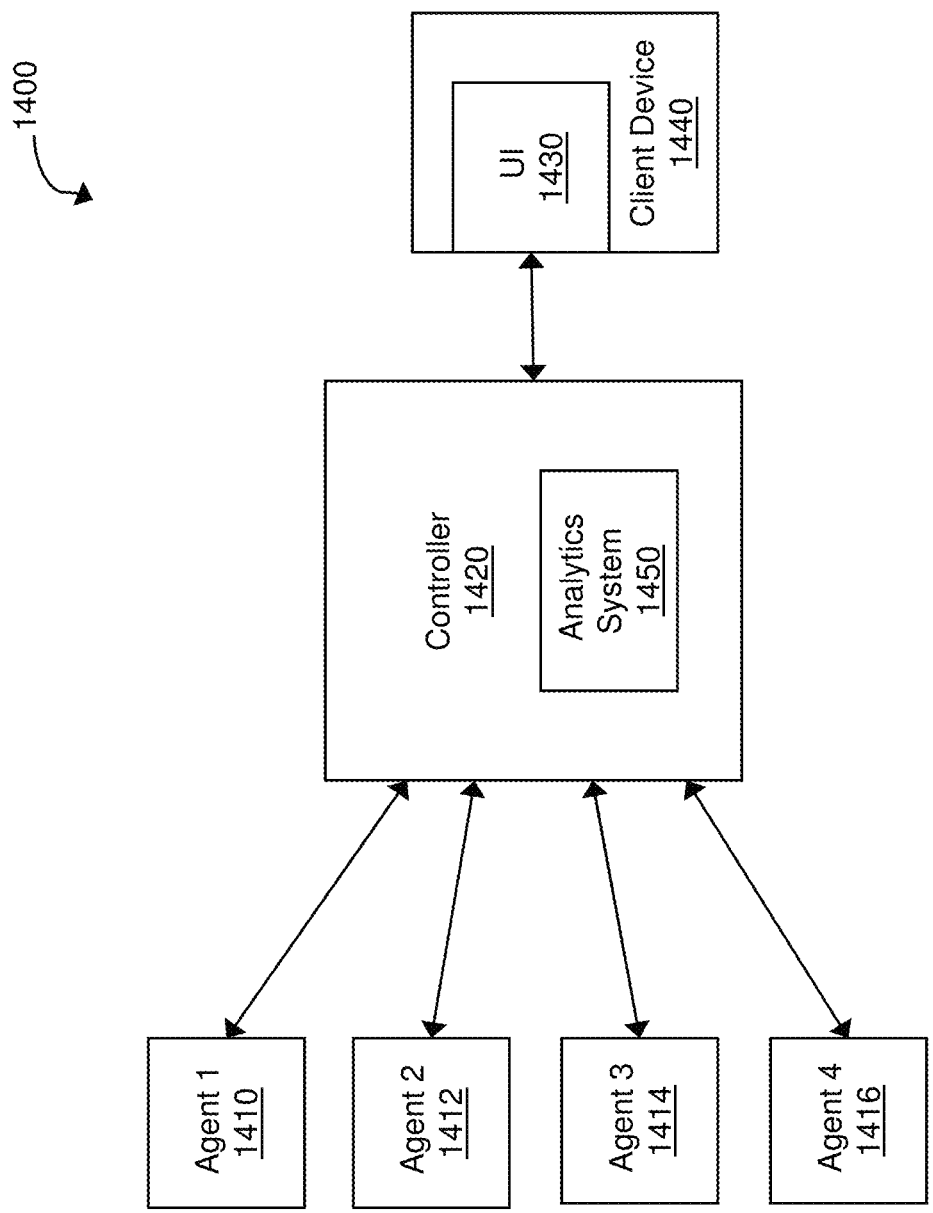
FIG. 14 is a block diagram of an exemplary application intelligence platform that can provide the guided exploration as disclosed in this patent document.

FIG. 14 is a block diagram of an exemplary application intelligence platform 1400 that can implement the guided exploration and automated root cause analysis as disclosed in this patent document. The application intelligence platform is a system that monitors and collect metrics of performance data for an application environment being monitored. At the simplest structure, the application intelligence platform includes one or more agents 1410, 1412, 1414, 1416 and one or more controllers 1420. While FIG. 14 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 1420 is the central processing and administration server for the application intelligence platform. The controller 1420 serves a browser-based user interface (UI) 1430 that is the primary interface for monitoring, analyzing, and troubleshooting the monitored environment. The controller 1420 can control and manage monitoring of business transactions distributed over application servers. Specifically, the controller 1420 can receive runtime data from agents 1410, 1412, 1414, 1416 and coordinators, associate portions of business transaction data, communicate with agents to configure collection of runtime data, and provide performance data and reporting through the interface 1430.

The interface 1430 may be viewed as a web-based interface viewable by a client device 1440. In some implementations, a client device 1440 can directly communicate with controller 1420 to view an interface for monitoring data.

In the Software as a Service (SaaS) implementation, a controller instance 1420 is hosted remotely by a provider of the application intelligence platform 1400. In the on-premise (On-Prem) implementation, a controller instance 1420 is installed locally and self-administered.

The controllers 1420 receive data from different agents 1410, 1412, 1414, 1416 deployed to monitor applications, databases and database servers, servers, and end user clients for the monitored environment. Any of the agents 1410, 1412, 1414, 1416 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser-database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 1420 can include an analysis system 1450 for provide the guided exploration and automated root cause analysis as disclosed in this patent document. In some implementations, the analytics system 1450 can be implemented in a separate machine (e.g., a server) different from the one hosting the controller 1420.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 15:
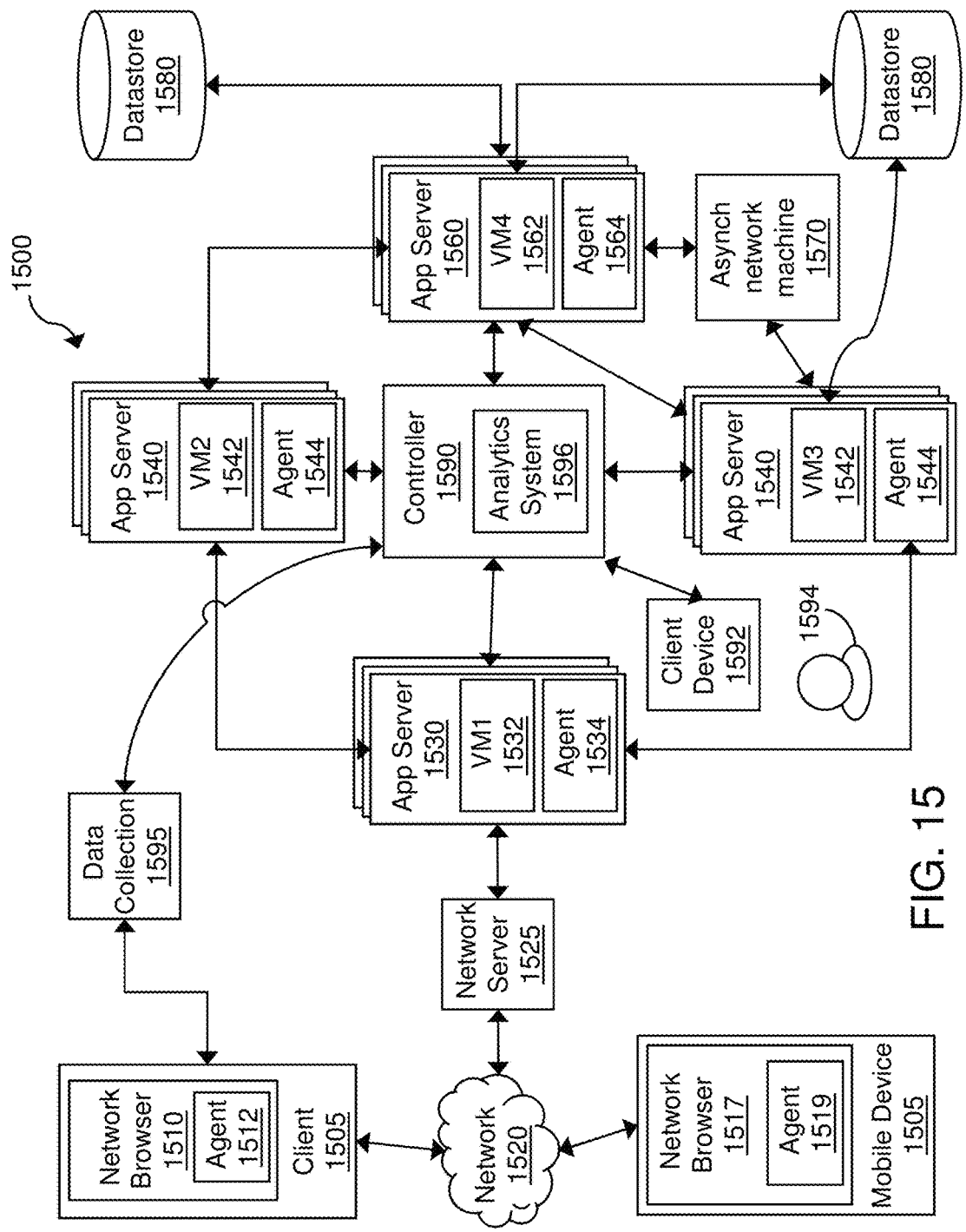
FIG. 15 is a block diagram of an exemplary system for providing the guided exploration as disclosed in this patent document, including the processes disclosed with respect to FIGS. 1-20.

FIG. 15 is a block diagram of an exemplary system 1500 for providing guided exploration and automated root cause analysis as disclosed in this patent document, including the processes disclosed with respect to FIGS. 1-14. The system 1500 in FIG. 15 includes client device 1505 and 1592, mobile device 1515, network 1520, network server 1525, application servers 1530, 1540, 1550 and 1560, asynchronous network machine 1570, data stores 1580 and 1585, controller 1590, and data collection server 1595. The controller 1590 can include an analysis system 1596 for providing guided exploration and automated root cause analysis as disclosed in this patent document. In some implementations, the analysis system 1596 can be implemented in a separate machine (e.g., a server) different from the one hosting the controller 1590.

Client device 1505 may include network browser 1510 and be implemented as a computing device, such as for example a laptop, desktop, workstation, or some other computing device. Network browser 1510 may be a client application for viewing content provided by an application server, such as application server 1530 via network server 1525 over network 1520.

Network browser 1510 may include agent 1512. Agent 1512 may be installed on network browser 1510 and/or client 1505 as a network browser add-on, downloading the application to the server, or in some other manner. Agent 1512 may be executed to monitor network browser 1510, the operating system of client 1505, and any other application, API, or other component of client 1505. Agent 1512 may determine network browser navigation timing metrics, access browser cookies, monitor code, and transmit data to data collection 1560, controller 1590, or another device. Agent 1512 may perform other operations related to monitoring a request or a network at client 1505 as discussed herein.

Mobile device 1515 is connected to network 1520 and may be implemented as a portable device suitable for sending and receiving content over a network, such as for example a mobile phone, smart phone, tablet computer, or other portable device. Both client device 1505 and mobile device 1515 may include hardware and/or software configured to access a web service provided by network server 1525.

Mobile device 1515 may include network browser 1517 and an agent 1519. Mobile device may also include client applications and other code that may be monitored by agent 1519. Agent 1519 may reside in and/or communicate with network browser 1517, as well as communicate with other applications, an operating system, APIs and other hardware and software on mobile device 1515. Agent 1519 may have similar functionality as that described herein for agent 1512 on client 1505, and may repot data to data collection server 1560 and/or controller 1590.

Network 1520 may facilitate communication of data among different servers, devices and machines of system 1500 (some connections shown with lines to network 1520, some not shown). The network may be implemented as a private network, public network, intranet, the Internet, a cellular network, Wi-Fi network, VoIP network, or a combination of one or more of these networks. The network 1520 may include one or more machines such as load balance machines and other machines.

Network server 1525 is connected to network 1520 and may receive and process requests received over network 1520. Network server 1525 may be implemented as one or more servers implementing a network service, and may be implemented on the same machine as application server 1530 or one or more separate machines. When network 1520 is the Internet, network server 1525 may be implemented as a web server.

Application server 1530 communicates with network server 1525, application servers 1540 and 1550, and controller 1590. Application server 1550 may also communicate with other machines and devices (not illustrated in FIG. 15). Application server 1530 may host an application or portions of a distributed application. The host application 1532 may be in one of many platforms, such as including a Java, PHP, .Net, and Node.JS, be implemented as a Java virtual machine, or include some other host type. Application server 1530 may also include one or more agents 1534 (i.e. "modules"), including a language agent, machine agent, and network agent, and other software modules. Application server 1530 may be implemented as one server or multiple servers as illustrated in FIG. 15.

Application 1532 and other software on application server 1530 may be instrumented using byte code insertion, or byte code instrumentation (BCI), to modify the object code of the application or other software. The instrumented object code may include code used to detect calls received by application 1532, calls sent by application 1532, and communicate with agent 1534 during execution of the application. BCI may also be used to monitor one or more sockets of the application and/or application server in order to monitor the socket and capture packets coming over the socket.

In some embodiments, server 1530 may include applications and/or code other than a virtual machine. For example, servers 1530, 1540, 1550, and 1560 may each include Java code, .Net code, PHP code, Ruby code, C code, C++ or other binary code to implement applications and process requests received from a remote source. References to a virtual machine with respect to an application server are intended to be for exemplary purposes only.

Agents 1534 on application server 1530 may be installed, downloaded, embedded, or otherwise provided on application server 1530. For example, agents 1534 may be provided in server 1530 by instrumentation of object code, downloading the agents to the server, or in some other manner. Agent 1534 may be executed to monitor application server 1530, monitor code running in a virtual machine 1532 (or other program language, such as a PHP, .Net, or C program), machine resources, network layer data, and communicate with byte instrumented code on application server 1530 and one or more applications on application server 1530.

Each of agents 1534, 1544, 1554 and 1564 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 1534 may detect operations such as receiving calls and sending requests by application server 1530, resource usage, and incoming packets. Agent 1534 may receive data, process the data, for example by aggregating data into metrics, and transmit the data and/or metrics to controller 1590. Agent 1534 may perform other operations related to monitoring applications and application server 1530 as discussed herein. For example, agent 1534 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 1590 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 1534 may create a request identifier for a request received by server 1530 (for example, a request received by a client 1505 or 1515 associated with a user or another source). The request identifier may be sent to client 1505 or mobile device 1515, whichever device sent the request. In embodiments, the request identifier may be created when a data is collected and analyzed for a particular business transaction.

Each of application servers 1540, 1550 and 1560 may include an application and agents. Each application may run on the corresponding application server. Each of applications 1542, 1552 and 1562 on application servers 1540-1560 may operate similarly to application 1532 and perform at least a portion of a distributed business transaction. Agents 1544, 1554 and 1564 may monitor applications 1542-1562, collect and process data at runtime, and communicate with controller 1590. The applications 1532, 1542, 1552 and 1562 may communicate with each other as part of performing a distributed transaction. In particular, each application may call any application or method of another virtual machine.

Asynchronous network machine 1570 may engage in asynchronous communications with one or more application servers, such as application server 1550 and 1560. For example, application server 1550 may transmit several calls or messages to an asynchronous network machine. Rather than communicate back to application server 1550, the asynchronous network machine may process the messages and eventually provide a response, such as a processed message, to application server 1560. Because there is no return message from the asynchronous network machine to application server 1550, the communications among them are asynchronous.

Data stores 1580 and 1585 may each be accessed by application servers such as application server 1550. Data store 1585 may also be accessed by application server 1550. Each of data stores 1580 and 1585 may store data, process data, and return queries received from an application server. Each of data stores 1580 and 1585 may or may not include an agent.

Controller 1590 may control and manage monitoring of business transactions distributed over application servers 1530-1560. In some embodiments, controller 1590 may receive application data, including data associated with monitoring client requests at client 1505 and mobile device 1515, from data collection server 1560. In some embodiments, controller 1590 may receive application monitoring data and network data from each of agents 1512, 1519, 1534, 1544 and 1554. Controller 1590 may associate portions of business transaction data, communicate with agents to configure collection of data, and provide performance data and reporting through an interface. The interface may be viewed as a web-based interface viewable by client device 1592, which may be a mobile device, client device, or any other platform for viewing an interface provided by controller 1590. In some embodiments, a client device 1592 may directly communicate with controller 1590 to view an interface for monitoring data.

Client device 1592 may include any computing device, including a mobile device or a client computer such as a desktop, work station or other computing device. Client computer 1592 may communicate with controller 1590 to create and view a custom interface. In some embodiments, controller 1590 provides an interface for creating and viewing the custom interface as a content page, e.g., a web page, which may be provided to and rendered through a network browser application on client device 1592.

Applications 1532, 1542, 1552 and 1562 may be any of several types of applications. Examples of applications that may implement applications 1532-1562 include a Java, PHP, .Net, Node.JS, and other applications.

FIG. 22 is a block diagram of a computer system 2200 for implementing the present technology. System 2200 of FIG. 22 may be implemented in the contexts of the likes of clients 1505, 1592, network server 1525, servers 1530, 1540, 1550, 1560, asynchronous network machine 1570 and controller 1590.

The computing system 1600 of FIG. 16 includes one or more processors 1610 and memory 1620. Main memory 1620 stores, in part, instructions and data for execution by processor 1610. Main memory 1610 can store the executable code when in operation. The system 1600 of FIG. 16 further includes a mass storage device 1630, portable storage medium drive(s) 1640, output devices 1650, user input devices 1660, a graphics display 1670, and peripheral devices 1680.

The components shown in FIG. 16 are depicted as being connected via a single bus 1690. However, the components may be connected through one or more data transport means. For example, processor unit 1610 and main memory 1620 may be connected via a local microprocessor bus, and the mass storage device 1630, peripheral device(s) 1680, portable or remote storage device 1640, and display system 1670 may be connected via one or more input/output (I/O) buses.

Mass storage device 1630, which may be implemented with a magnetic disk drive or an optical disk drive, is a non-volatile storage device for storing data and instructions for use by processor unit 1610. Mass storage device 1630 can store the system software for implementing embodiments of the present invention for purposes of loading that software into main memory 620.

Portable storage device 1640 operates in conjunction with a portable non-volatile storage medium, such as a compact disk, digital video disk, magnetic disk, flash storage, etc. to input and output data and code to and from the computer system 1600 of FIG. 16. The system software for implementing embodiments of the present invention may be stored on such a portable medium and input to the computer system 1600 via the portable storage device 1640.

Input devices 1660 provide a portion of a user interface. Input devices 1660 may include an alpha-numeric keypad, such as a keyboard, for inputting alpha-numeric and other information, or a pointing device, such as a mouse, a trackball, stylus, or cursor direction keys. Additionally, the system 1600 as shown in FIG. 16 includes output devices 1650. Examples of suitable output devices include speakers, printers, network interfaces, and monitors.

Display system 1670 may include a liquid crystal display (LCD) or other suitable display device. Display system 1670 receives textual and graphical information, and processes the information for output to the display device.

Peripherals 1680 may include any type of computer support device to add additional functionality to the computer system. For example, peripheral device(s) 1680 may include a modem or a router.

The components contained in the computer system 1600 of FIG. 16 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 1600 of FIG. 16 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for providing a guided exploration of a monitored entity, including:
   a processor;
   a memory; and
   one or more modules stored in the memory and executable by a processor to perform operations including:

detect a performance issue associated with the monitored entity in a monitored environment;

generate entity relationship data indicative of a chain of relationships among different entities associated with the detected performance issue;

provide a dashboard user interface to enable a user to view the generated entity relationship data;

receive user input through the dashboard user interface that indicate a starting point of the guided exploration;

display the entity relationship data at the starting point in the chain of relationships among the different entities associated with the detected performance issue;

display a user selectable list of entities related to a starting point entity;

automatically add a widget to a display portion of the dashboard user interface; and change the display of the entity relationship data along the chain of relationships among the different entities associated with the detected performance issue based on additional user input received through the dashboard user interface, wherein the entity relationship is changed by:

displaying a new list of user selectable entities related to a previously selected entity and one or more new lists of user selectable datatypes and data available for the new list of user selectable entities related to the most recently user selected related entity, receiving a user selection of one of the user selectable related entities from the new list, user selection of one of the datatypes and one of the data from the new lists of datatypes and data available for the new list of user selectable entities, and automatically adding a new widget to the display portion of the dashboard user interface, the new widget displaying the user selected new datatype and data available for the user selected related entity selected from the new list.

2. The system of claim 1, wherein the monitored entity includes a business transaction and the user input indicating the starting point entity associated with the detected performance issue for starting the guided exploration includes a business transaction, a tier, a node, a database, a network, a machine, or a process.

3. The system of claim 1, wherein the one or more modules are executable by a processor to display a list of user selectable datatypes and data available for the user selectable entities related to the starting point entity.

4. The system of claim 3, wherein the one or more modules are executable by a processor to receive through the dashboard user interface, user input selecting one of the user selectable entities related to the starting point entity, one of the user selectable datatypes, and one of the user selectable data available for the user selectable entities related to the starting point entity.

5. The system of claim 4, wherein the widget and the new widget display the user selected datatype and data available for the selected related entity.

6. The system of claim 1, wherein the datatype and the new datatype include metric, events, logs, snapshots, or configurations.

7. The system of claim 1, wherein the data and new data include average response time, calls per minute, load, number of slow calls, or number of very slow calls.

8. The system of claim 1, wherein the new widget is overlaid on top of the widget or displayed adjacent to the widget.

9. The system of claim 1, wherein the widget and the new widget are customizable on the display portion of the dashboard user interface.

10. The system of claim 1, wherein the one or more modules are executable by a processor to perform operations including:

provide a user selectable filter for at least one of the lists of related entities, datatypes, data, new related entities, new datatypes, and new data;

receive user input making a selection on the provided filter; and change the display of the entity relationship data to include a result of the received filter selection.

11. The system of claim 10, wherein the one or more modules are executable by a processor to generate a template showing the user selections of the starting point entity, the related entity along the chain of entity relationships, and the filter selection.

12. The system of claim 11, wherein the one or more modules are executable by a processor to perform operations including:

receive user input changing one of the entities in the generated template; and automatically change the entity relationship data to reflect the change of one of the entities.

13. The system of claim 10, wherein the one or more modules are executable by a processor to perform operations including providing a collaboration tool associated with the dashboard user interface to enable multiple users to collaborate on the template.

14. A method for providing a guided exploration of a monitored business transaction, including:

detecting a performance issue associated with the business transaction running in a monitored environment;

generating entity relationship data indicative of a chain of relationships among different entities associated with the detected performance issue;

providing a dashboard user interface to enable a user to view the generated entity relationship data;

receiving user input through the dashboard user interface that indicate a starting point of the guided exploration;

displaying the entity relationship data at the starting point in the chain of relationships among the different entities associated with the detected performance issue;

displaying a user selectable list of entities related to a starting point entity;

automatically adding a widget to a display portion of the dashboard user interface; and changing the display of the entity relationship data along the chain of relationships among the different entities associated with the detected performance issue based on additional user input received through the dashboard user interface, wherein the entity relationship is changed by:

displaying a new list of user selectable entities related to a previously selected entity and one or more new lists of user selectable datatypes and data available for the new list of user selectable entities related to the most recently user selected related entity, receiving a user selection of one of the user selectable related entities from the new list, user selection of one of the datatypes and one of the data from the new lists of datatypes and data available for the new list of user selectable entities, and automatically adding a new widget to the display portion of the dashboard user interface, the new widget displaying the user selected new datatype and data available for the user selected related entity selected from the new list.

15. The method of claim 14, wherein the monitored entity includes a business transaction and the method includes:
displaying a list of user selectable datatypes and data available for the user selectable entities related to the starting point entity.

16. The method of claim 15, including receiving user input selecting one of the user selectable entities related to the starting point entity, one of the user selectable datatypes, and one of the user selectable data available for the user selectable entities related to the starting point entity.

17. The method of claim 16, wherein the widget and the new widget display the user selected datatype and data available for the selected related entity.

18. The method of claim 14, including:
providing a user selectable filter for at least one of the lists of related entities, datatypes, data, new related entities, new datatypes, and new data;
receiving user input making a selection on the provided filter; and
changing the display of the entity relationship data to include a result of the received filter selection.

19. The method of claim 18, including generating a template showing the user selections of the starting point entity, the related entity along the chain of entity relationships, and the filter selection.

20. The method of claim 19, including:
receiving user input changing one of the entities in the generated template; and
automatically change the entity relationship data to reflect the change of one of the entities.

21. The method of claim 19, including providing a collaboration tool associated with the dashboard user interface to enable multiple users to collaborate on the template.

22. A non-transitory computer readable medium embodying instructions when executed by a processor to cause operations to be performed including:
detecting a performance issue associated with a monitored entity in a monitored environment;
generating entity relationship data indicative of a chain of relationships among different entities associated with the detected performance issue;
providing a dashboard user interface to enable a user to view the generated entity relationship data;
receiving user input through the dashboard user interface that indicate a starting point of the guided exploration;
displaying the entity relationship data at the starting point in the chain of relationships among the different entities associated with the detected performance issue;
displaying a user selectable list of entities related to a starting point entity;
automatically adding a widget to a display portion of the dashboard user interface; and
changing the display of the entity relationship data along the chain of relationships among the different entities associated with the detected performance issue based on additional user input received through the dashboard user interface, wherein the entity relationship is changed by:
displaying a new list of user selectable entities related to a previously selected entity and one or more new lists of user selectable datatypes and data available for the new list of user selectable entities related to the most recently user selected related entity,
receiving a user selection of one of the user selectable related entities from the new list, user selection of one of the datatypes and one of the data from the new lists of datatypes and data available for the new list of user selectable entities, and
automatically adding a new widget to the display portion of the dashboard user interface, the new widget displaying the user selected new datatype and data available for the user selected related entity selected from the new list.

23. The non-transitory computer readable medium of claim 22, including:
displaying a list of user selectable datatypes and data available for the user selectable entities related to the starting point entity.

* * * * *

UNITED STATES PATENT AND TRADEMARK OFFICE
CERTIFICATE OF CORRECTION

PATENT NO. : 10,402,052 B2
APPLICATION NO. : 15/224391
DATED : September 3, 2019
INVENTOR(S) : Jad Naous Page 1 of 1

It is certified that error appears in the above-identified patent and that said Letters Patent is hereby corrected as shown below:

In the Specification

Column 1, Lines 26, should read:
processor; a memory; and one or more modules stored in the Signed and Sealed this
Twenty-fourth Day of March, 2020

Andrei Iancu
*Director of the United States Patent and Trademark Office*